United States Patent
Oshima et al.

(10) Patent No.: US 9,873,371 B2
(45) Date of Patent: Jan. 23, 2018

(54) HEADLIGHT DEVICE

(71) Applicant: MITSUBISHI ELECTRIC CORPORATION, Tokyo (JP)

(72) Inventors: Ritsuya Oshima, Tokyo (JP); Masashige Suwa, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/112,721

(22) PCT Filed: Jan. 23, 2015

(86) PCT No.: PCT/JP2015/051795
§ 371 (c)(1),
(2) Date: Jul. 20, 2016

(87) PCT Pub. No.: WO2015/115319
PCT Pub. Date: Aug. 6, 2015

(65) Prior Publication Data
US 2016/0339834 A1    Nov. 24, 2016

(30) Foreign Application Priority Data

Jan. 30, 2014    (JP) ................................. 2014-015392

(51) Int. Cl.
*F21V 17/02*    (2006.01)
*B60Q 1/115*    (2006.01)
(Continued)

(52) U.S. Cl.
CPC ................ *B60Q 1/115* (2013.01); *B60Q 1/12* (2013.01); *B62J 6/02* (2013.01); *F21S 48/1154* (2013.01);
(Continued)

(58) Field of Classification Search
CPC ......................... F21S 48/1778; F21S 48/1721
(Continued)

(56) References Cited

U.S. PATENT DOCUMENTS 7,370,996 B2 *   5/2008   Ohshio ............... F21S 48/1388
                                                       362/284
2009/0080210 A1    3/2009   Reiners et al.

FOREIGN PATENT DOCUMENTS

JP    2001-347977 A    12/2001
JP    2008-10265 A      1/2008
(Continued)

*Primary Examiner* — Jamara Franklin
(74) *Attorney, Agent, or Firm* — Birch, Stewart, Kolasch & Birch, LLP

(57) ABSTRACT

A headlight device includes a light source, a base member, a light distribution formation member, a rotary member, a projection lens and a transmission mechanism. The base member holds the light source. The light distribution formation member forms a light distribution pattern. The rotary member holds the light distribution formation member and is held by the base member to be rotatable. The projection lens is held by the rotary member to be rotatable around a rotation axis orthogonal to a rotation axis. The transmission mechanism includes a transmission member for transmitting a rotation amount of the rotary member with respect to the base member to the projection lens and rotates the projection lens according to the rotation of the rotary member with respect to the base member.

9 Claims, 19 Drawing Sheets

(51) Int. Cl.
  *B62J 6/02* (2006.01)
  *F21S 8/10* (2006.01)
  *B60Q 1/12* (2006.01)

(52) U.S. Cl.
  CPC ....... *F21S 48/1159* (2013.01); *F21S 48/1208* (2013.01); *F21S 48/1225* (2013.01); *F21S 48/1241* (2013.01); *F21S 48/1258* (2013.01); *F21S 48/1291* (2013.01); *F21S 48/145* (2013.01); *F21S 48/1721* (2013.01); *F21S 48/328* (2013.01); *B60Q 2300/136* (2013.01)

(58) Field of Classification Search
  USPC ........................................................ 362/513
  See application file for complete search history.

(56) References Cited

FOREIGN PATENT DOCUMENTS

| | | |
|---|---|---|
| JP | 2008-41385 A | 2/2008 |
| JP | 2008-535166 A | 8/2008 |
| JP | 2008-207770 A | 9/2008 |
| JP | 2009-166573 A | 7/2009 |

* cited by examiner

HEADLIGHT DEVICE

TECHNICAL FIELD

The present invention relates to a headlight device that provides a driver with an appropriate light distribution when a motorcycle or the like tilts its vehicle body at times such as turning.

BACKGROUND ART

The headlight of a motorcycle is attached directly to the vehicle body. Thus, when the motorcycle banks at times such as turning, an illumination region illuminated with the headlight also tilts in the same way. The "turning" means changing the direction along a curved line. In cases of motorcycles, four-wheeled automobiles, etc., the "turning" means going around a curve. To "bank" means to tilt the vehicle body inward when the vehicle goes around a curve. Thus, when a motorcycle turns, the size of the visual field and the visibility decrease compared to those when the motorcycle travels in a straight line.

In recent years, there exist headlights of a light distribution variable type that change the headlight's light distribution depending on the bank of the vehicle body. The "light distribution" means luminosity distribution of a light source with respect to space. In other words, the "light distribution" means spatial distribution of light emitted from the light source.

At times of turning, the vehicle body travels like drawing a circle on the bank side of the vehicle body, and thus the line of vision of the driver is pointed toward a distant region on the inside of the corner where the vehicle body banks. The "bank side" means the direction in which the vehicle body tilts. The light distribution of the headlight needs to undergo not only correction regarding the tilt of the headlight due to the tilt of the vehicle body but also correction regarding the traveling direction of the vehicle body.

A headlight of the light distribution variable type described in Patent Reference 1 realizes both the correction regarding the tilt of the vehicle body and the correction regarding the change in the traveling direction at times such as the turning of a motorcycle. In the Patent Reference 1, a reflector is rotated around a longitudinal axis (X-axis) for the correction regarding the tilt of the vehicle body. For the correction regarding the change in the traveling direction, the reflector is rotated around an up-and-down axis (Z-axis). In short, in the Patent Reference 1, the entire light unit is rotated for the correction of the light distribution.

PRIOR ART REFERENCE

Patent Reference

Patent Reference 1: Japanese Patent Application Publication No. 2008-207770

SUMMARY OF THE INVENTION

Problem to be Solved by the Invention

In the Patent Reference 1, however, the correction of the light distribution is made by driving the entire light unit. Thus, a space sufficient for the movement of the light unit is necessary. As a result, the entire headlight increases in size. Further, driving force for moving the entire light unit increases. As a result, the driving unit increases in size.

The present invention, which has been made to solve the above-described problem, realizes the correction of the light distribution regarding the tilt of the vehicle body and the correction of the light distribution regarding the change in the traveling direction of the vehicle body with a small-sized and simple structure.

Means for Solving the Problem

A headlight device according to the present invention includes: a light source which emits light; a base member which holds the light source; a light distribution formation member which receives the light incident thereon and forms a light distribution pattern of the light; a rotary member which holds the light distribution formation member and is held by the base member to be rotatable around a first rotation axis; a projection lens which receives the light of which the light distribution pattern is formed, emits the light as projection light, and is held by the rotary member to be rotatable around a second rotation axis orthogonal to the first rotation axis; and a transmission mechanism which includes a transmission member for transmitting a rotation amount of the rotary member around the first rotation axis with respect to the base member to the projection lens and rotates the projection lens around the second rotation axis according to rotation of the rotary member with respect to the base member. The second rotation axis extends in a direction corresponding to an up-and-down direction of the light distribution pattern of the projection light.

Effects of the Invention

A headlight unit capable of changing the light distribution of the projection light can be downsized.

MODE FOR CARRYING OUT THE INVENTION

First Embodiment

Figure 1:
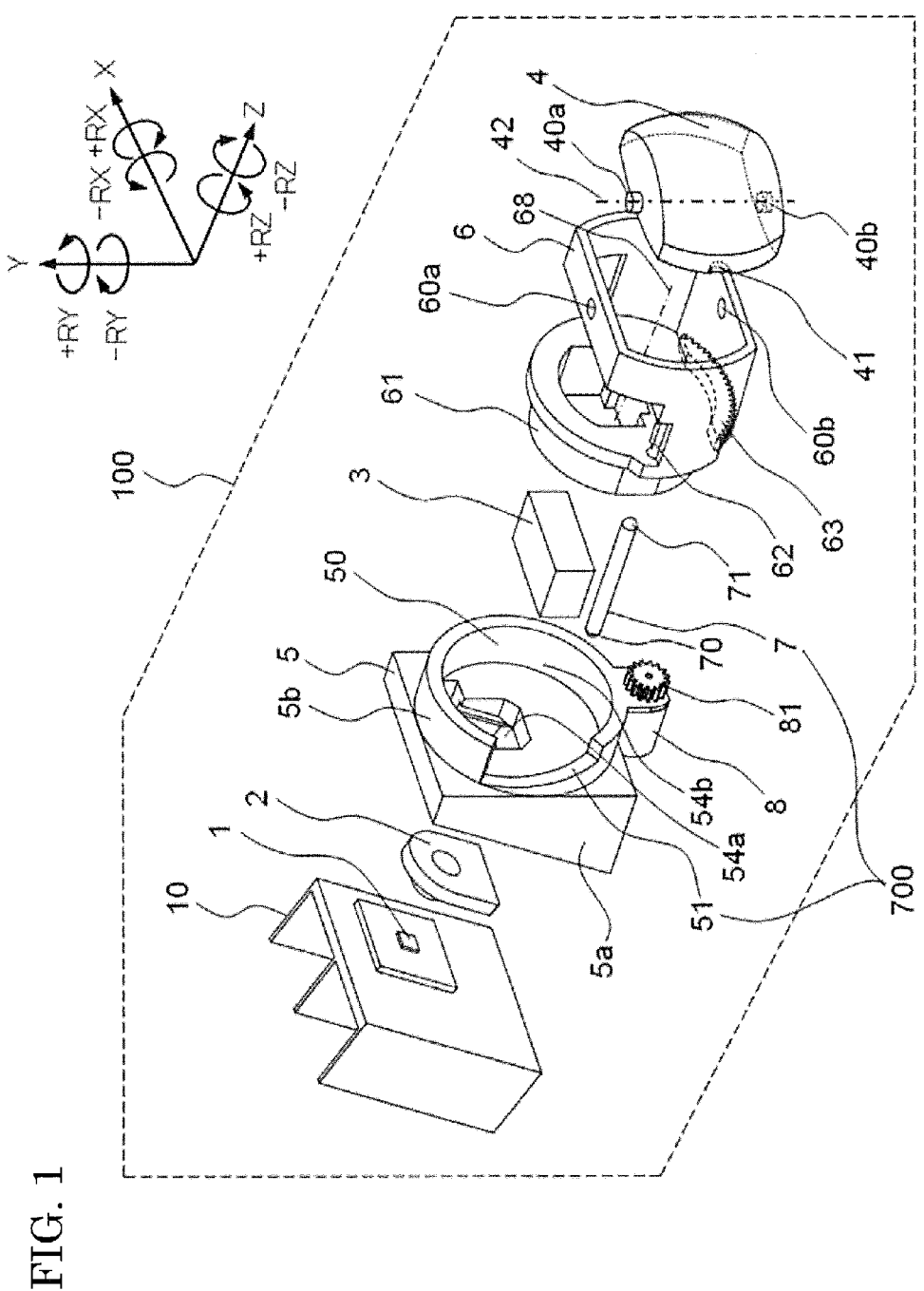
FIG. 1 is an exploded front perspective view of a headlight device 100 according to a first embodiment.

To facilitate explanations in the following description, orthogonal coordinate axes X, Y and Z are indicated in each drawing. A forward direction of a headlight device 100 is defined as a +Z-axis direction, while a backward direction is defined as a −Z-axis direction. Here, the "forward direction" means the traveling direction of the vehicle. In other words, the "forward direction" is the direction in which the headlight device emits light. When facing forward, the left-hand side of the headlight device 100 is defined as a +X-axis direction, while the right-hand side is defined as a −X-axis direction. An upward direction of the headlight device 100 (the direction toward the sky) is defined as a +Y-axis direction, while a downward direction of the headlight device 100 (the direction toward the ground) is defined as a −Y-axis direction. When facing forward, the clockwise direction around the Z-axis as the central axis is defined as a +RZ direction, while the counterclockwise direction is defined as a −RZ direction. When viewing the headlight device 100 in a direction from its right-hand side (−X-axis direction) to its left-hand side (+X-axis direction), the clockwise direction around the X-axis as the central axis is defined as a +RX direction, while the counterclockwise direction is defined as a −RX direction. When viewing the headlight device 100 in a direction from its bottom (−Y-axis direction) to its top (+Y-axis direction), the clockwise direction around the Y-axis as the central axis is defined as a +RY direction, while the counterclockwise direction is defined as a −RY direction.

<Traveling Status of Vehicle and Light Distribution Patterns>

First, traveling status of the vehicle and light distribution patterns will be explained.

The "light distribution pattern" means the shape of a luminous flux and light intensity distribution resulting from the direction of light emitted from the light source. The "light distribution pattern" will be used also in the meaning of an illuminance pattern on an imaginary surface (illuminated surface) which is set in front of the vehicle. The illuminated surface is a surface parallel to the X-Y plane. The position of the illuminated surface is the position where the illuminance or the luminosity of the headlight device is measured. The position of the illuminated surface is stipulated in road traffic rules or the like.

The "luminosity", representing the level of intensity of light emitted by an illuminant, is obtained by dividing a luminous flux passing through a minute solid angle in a certain direction by the minute solid angle. The "illuminance" is a physical quantity representing brightness of light applied to a planar object. The illuminance equals a luminous flux applied to a unit area.

The light distribution pattern to be emitted from the vehicle headlight device is stipulated in road traffic rules or the like. For example, a prescribed light distribution pattern regarding an automobile low beam is in a horizontally long shape that is narrow in the up-and-down direction. Here, "prescribed" means to have been stipulated in road traffic rules or the like.

Further, so as not to dazzle the drivers of oncoming vehicles, a light boundary line at the upper side of the light distribution pattern (cutoff line) is required to be distinct. Specifically, a distinct cutoff line, with a dark area extending above the cutoff line (on the outside of the light distribution pattern) and a bright area extending below the cutoff line (on the inside of the light distribution pattern), is required.

Here, the "cutoff line" means a separator line between a bright part and a dark part of light that are formed when the light from the vehicle headlight device is applied to a wall, screen, or the like, that is, a separator line at the upper side of the light distribution pattern. In other words, the cutoff line is a boundary line between a bright part and a dark part of light at the upper side of the light distribution pattern.

The cutoff line is a term that is used in the adjustment of the illumination direction of a headlight for passing by each other. The headlight for passing by each other is referred to also as a low beam. The "distinct cutoff line" means that no major chromatic aberration or blurring or the like is allowed in the cutoff line.

Furthermore, for the recognition of pedestrians, recognition of traffic signs, etc., the light distribution pattern has to have a "rising line" that raises the illumination on the sidewalk's side. Moreover, a region below the cutoff line (on the inside of the light distribution pattern) is required to be at the maximum illuminance. Here, the "rising line that raises the illumination" represents the shape of the light distribution pattern of the low beam that is horizontal on the oncoming vehicle's side and obliquely rising on the sidewalk's side. This is for visually recognizing humans or traffic signs or the like existing on the sidewalk's side without dazzling oncoming vehicles.

Incidentally, the "low beam" is a downward beam to be used in situations like passing by oncoming vehicles. In general, the low beam illuminates approximately 40 m ahead, for example. The "up-and-down direction" means a direction orthogonal to the ground surface. The vehicle headlight device is required to realize such complicated light distribution patterns.

To simplify the explanation, the following description will be given assuming that the shape of the light distribution pattern is a horizontally long shape that is narrow in the up-and-down direction and the shape of the upper side of the light distribution pattern is a straight line parallel to a line H-H. Incidentally, the line H-H represents a horizontal line at the position of the vehicle body.

The headlight device of a motorcycle is mounted directly on the vehicle body. Thus, when the motorcycle turns and tilts, the headlight device tilts in the same way as the motorcycle. Further, the light distribution pattern of the headlight device also tilts in the same way as the motorcycle.

FIGS. 15, 16, 18, and 19 are explanatory diagrams showing light distribution patterns 501 of the headlight device with respect to a road 500.

The light distribution pattern 501 is an illumination region to which the headlight device 100 applies light. The line V-V represents a perpendicular line at the position of the vehicle body. The line H-H represents a horizontal line at the position of the vehicle body. To simplify the explanation, the road surface of the road 500 is assumed to be a horizontal plane with no tilt. The "perpendicular" means the direction of the gravity.

Here, the "horizontal plane" means a plane parallel to the road surface. Thus, the Z-X plane is regarded as a plane parallel to the road surface. This is because the road surface is a "horizontal plane" in common conception. Therefore, the Z-X plane is regarded as a "horizontal plane". The "horizontal plane" is a plane orthogonal to the direction of the gravity.

However, there are cases where the road surface is tilted with respect to the traveling direction of the vehicle, such as ascending slopes and descending slopes. In such cases, the "horizontal plane" is regarded as a plane parallel to the road surface. The "horizontal plane" is tilted in the traveling direction of the vehicle. Thus, the "horizontal plane" is not a plane orthogonal to the direction of the gravity.

On the other hand, it is rare for an ordinary road surface to be tilted in the left-and-right direction with respect to the traveling direction of the vehicle. The "left-and-right direction" means the width direction of the road. In the left-and-right direction, the "horizontal plane" is regarded as a plane orthogonal to the gravity direction.

For example, even when the road surface is tilted in the left-and-right direction and the vehicle is orthogonal to the road surface in the left-and-right direction, this is equivalent to a state in which the vehicle is tilted with respect to the "horizontal plane" in the left-and-right direction. Thus, even when the road surface is tilted in the left-and-right direction and the vehicle is orthogonal to the left-and-right direction of the road surface, this state is considered to be equivalent to a state in which the vehicle is tilted in the left-and-right direction with respect to the "horizontal plane".

For the sake of simplification, the following explanation will be given assuming that the "horizontal plane" is a plane orthogonal to the gravity direction, that is, the Z-X plane is a plane orthogonal to the gravity direction.

Edges 504 of the road 500 are indicated by two lines. A center line 502 exists on the right-hand side of the line V-V. Since the vehicle is traveling on the lane on the left-hand side, the center line 502 is situated on the right-hand side of the line V-V. Subsequent drawings showing the light distribution patterns 501 illustrate cases where the vehicle is traveling on the left-hand side similarly to FIG. 15.

As mentioned above, to simplify the explanation, the following description, including another embodiment, will be given on the assumption that the road surface is not tilted.

Figure 15:
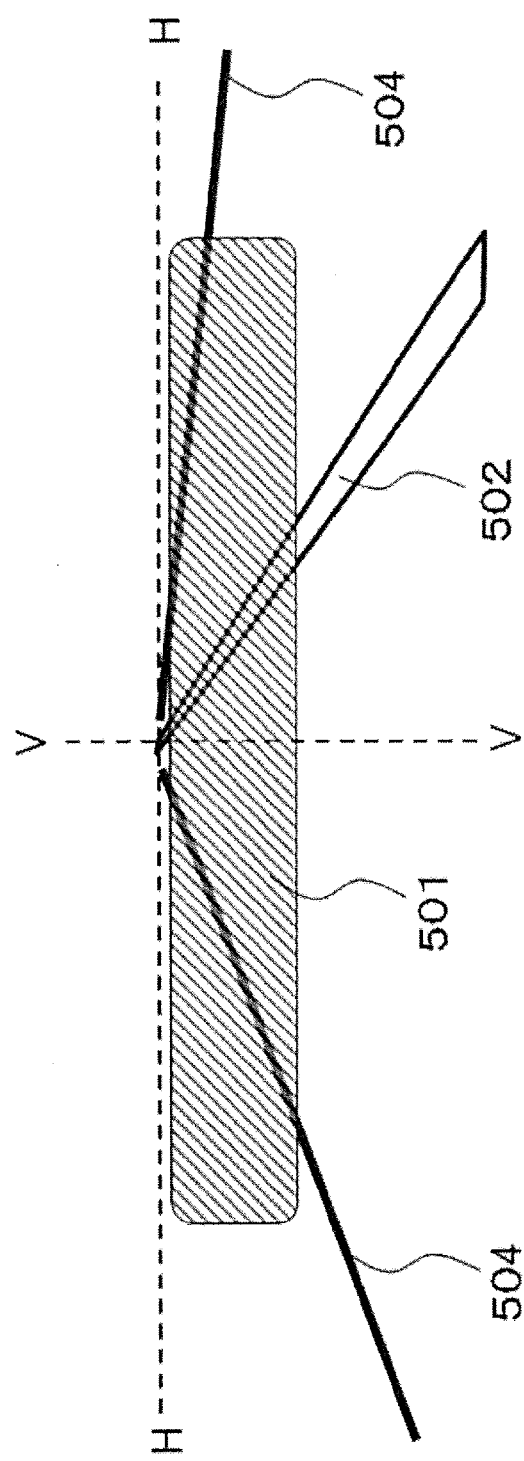
FIG. 15 is an explanatory diagram showing a light distribution pattern 501 of a headlight device with respect to a road 500.
Figure 16:
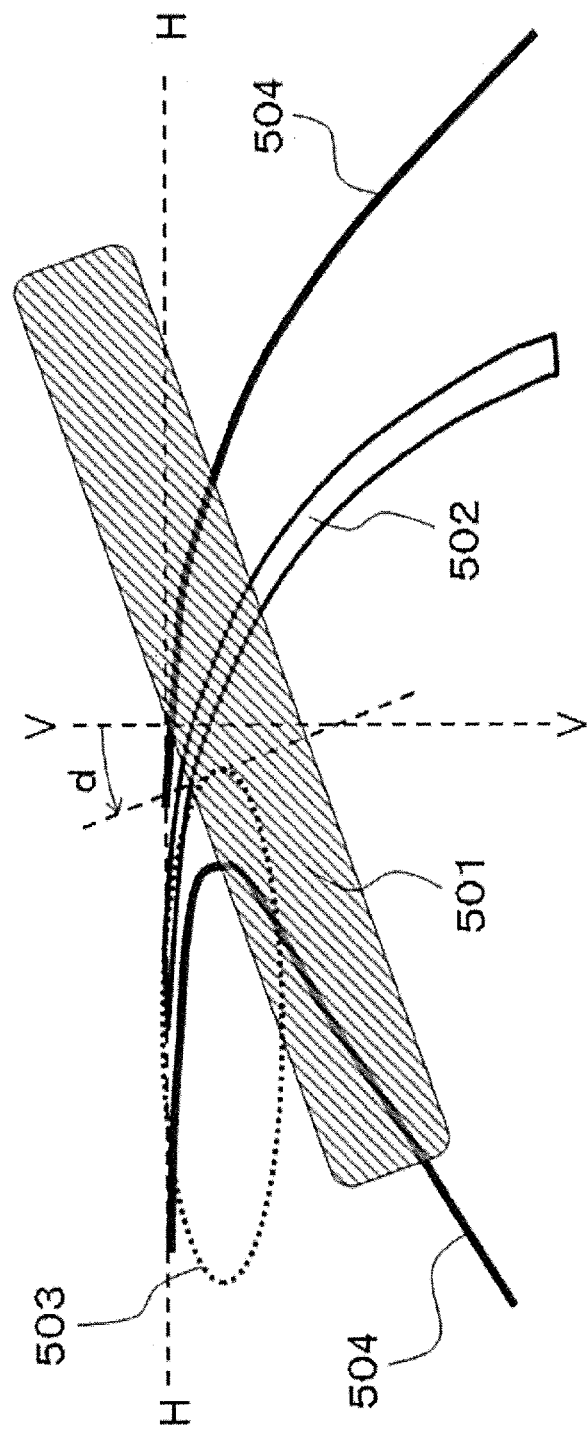
FIG. 16 is an explanatory diagram showing a light distribution pattern 501 of a headlight device with respect to a road 500.

FIG. 15 is a diagram showing an example of the light distribution pattern 501 in a situation where the vehicle is traveling on the left traffic lane side of a straight road with no tilt of the vehicle body. FIG. 16 is a diagram showing an example of the light distribution pattern 501 in a situation where the vehicle is traveling on the left traffic lane side of a leftward-curving road while tilting the vehicle body leftward by an angle of d degrees.

The light distribution pattern 501 is in a horizontally long shape narrow in the up-and-down direction. In FIG. 15, the upper side of the light distribution pattern 501 is in the shape of a straight line parallel to the line H-H.

The light distribution pattern 501 shown in FIG. 15 is long in the horizontal direction and is illuminating a desired region. The "desired region" is a region necessary for the driver to drive. Thus, the headlight device is illuminating a region necessary for the driver to drive.

However, the light distribution pattern 501 shown in FIG. 16 is illuminating ahead in a state of ascending rightward and descending leftward. The state shown in FIG. 16 occurs when the vehicle travels while turning leftward, for example. In this case, the driver's line of vision is pointed at a corner region 503 situated on the front left side with respect to the traveling direction.

The corner region 503 in FIG. 16 is indicated by a broken line. In FIG. 16, the corner region 503 is situated on the left-hand side of the line V-V. The upper side of the corner region 503 is indicated to be in contact with the line H-H.

When a motorcycle equipped with an ordinary type of headlight device travels while turning, the corner region 503 the driver wants to see is not illuminated as shown in FIG. 16. On the other hand, due to the light distribution pattern 501 ascending rightward, the headlight device illuminates a high position (upper part) above the lane on the opposite side (right-hand side) in the traveling direction. Accordingly, there is a possibility of casting dazzling light toward oncoming vehicles.

Figure 17:
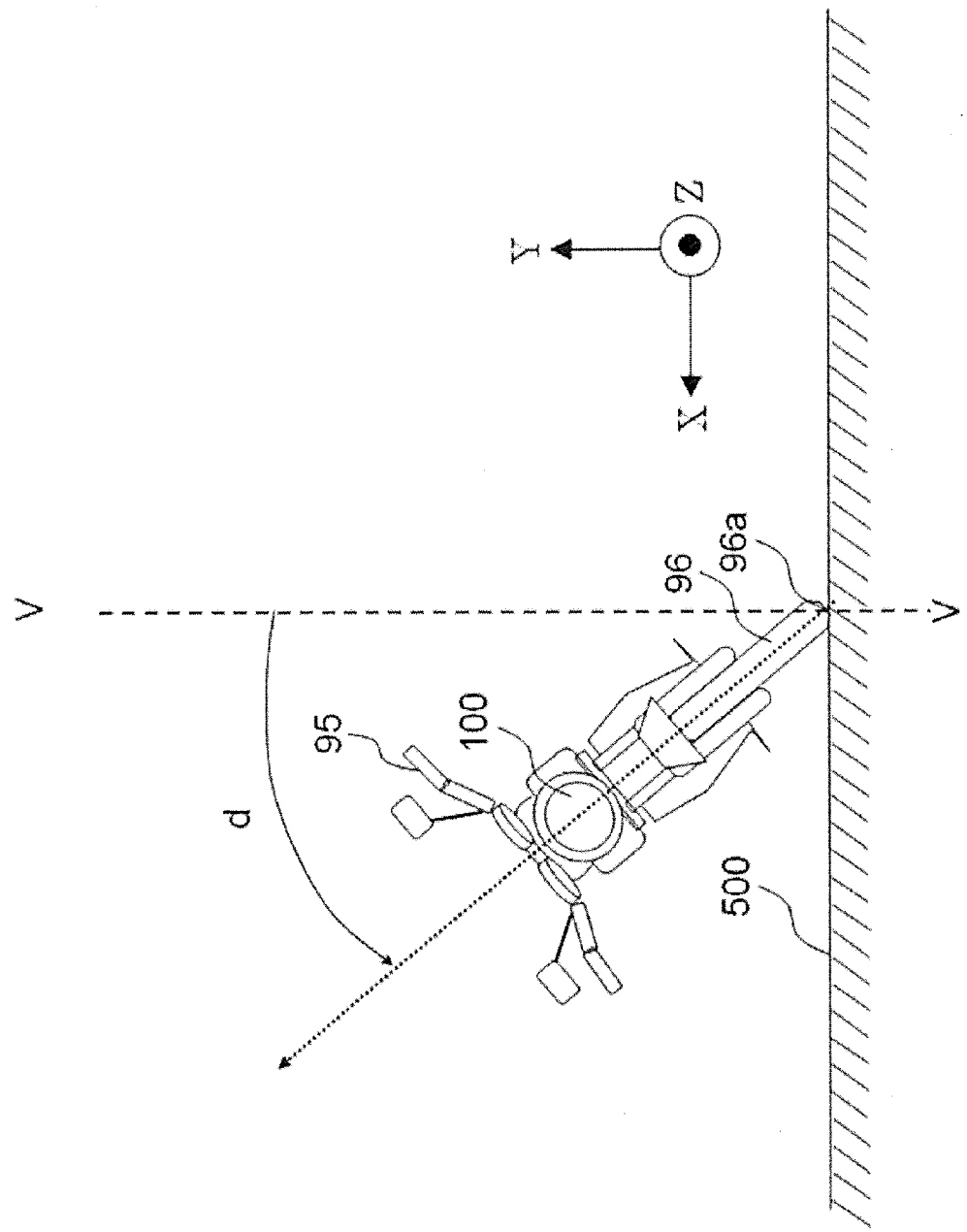
FIG. 17 is a schematic diagram for explaining a tilt angle d.

FIG. 17 is a schematic diagram for explaining the tilt angle d of the vehicle body. FIG. 17 is a schematic diagram showing a tilted state of the vehicle body of a motorcycle 95 viewed from the front of the motorcycle 95. In FIG. 17, the motorcycle 95 is tilted rightward (to the +X-axis side) with respect to the traveling direction by the tilt angle d.

When tilting, the motorcycle 95 rotates around a position 96a where a wheel 96 contacts the surface of the road 500. The angle of the tilt of the vehicle body is the tilt angle d. Thus, the motorcycle 95 rotates leftward or rightward around the position 96a of contact of the wheel 96 with the ground surface as the rotation center.

In FIG. 17, the motorcycle 95 is rotated around the position 96a of contact of the wheel 96 with the ground surface as the rotation center by the tilt angle d counterclockwise as viewed from the +Z-axis direction. The headlight device 100 is attached to a part of the motorcycle 95 in the vicinity of the handle bar. In this case, it can be understood that the headlight device 100 is also tilted by the tilt angle d.

Incidentally, the tilt angle d of the vehicle body of the motorcycle with respect to the line V-V will be referred to also as a bank angle. Further, the direction in which the vehicle body tilts will be referred to also as a bank direction.

Figure 18:
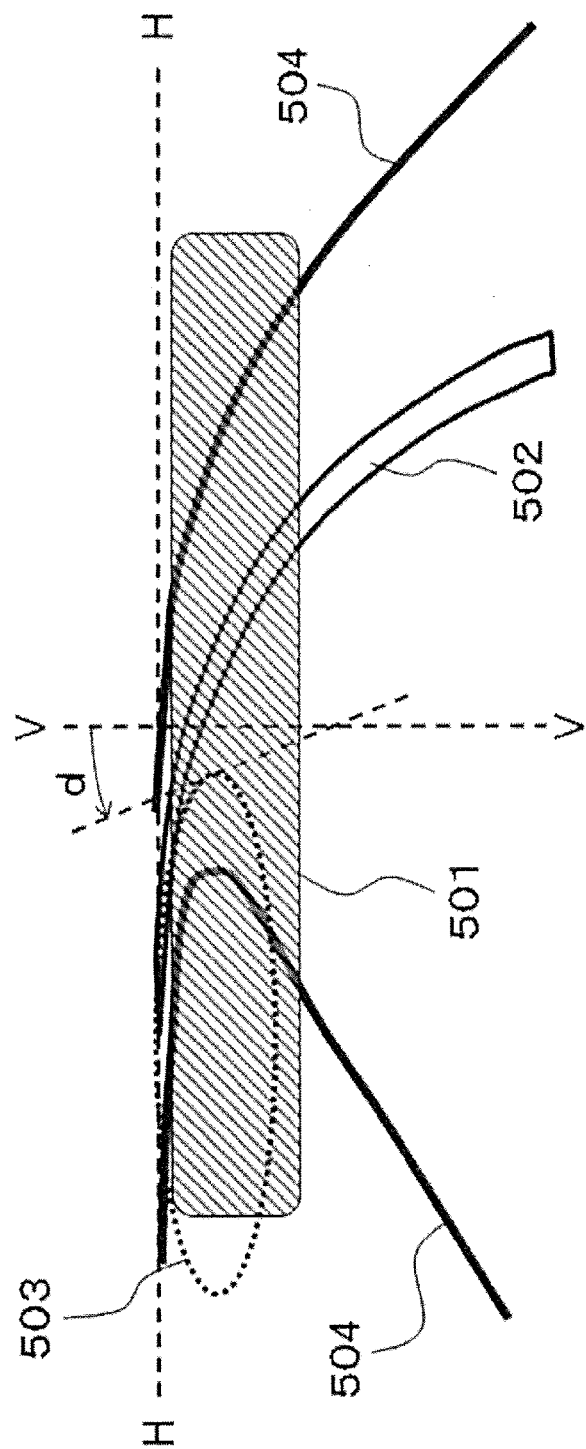
FIG. 18 is an explanatory diagram showing a light distribution pattern 501 of a headlight device with respect to a road 500.

FIG. 18 is a diagram showing a state in which the headlight device 100 is returned the tilted light distribution pattern 501 to the horizontal attitude. The headlight device 100 having the function of varying the light distribution is capable of returning the tilted light distribution pattern 501 to the horizontal attitude when the vehicle turns and travels as shown in FIG. 18.

The light distribution pattern 501 returned to the horizontal attitude is capable of illuminating the corner region 503 that the driver wants to see. In other words, the corner region 503 is contained in the scope of the light distribution pattern 501. In FIG. 18, most of the corner region 503 is contained in the scope of the light distribution pattern 501.

Figure 19:
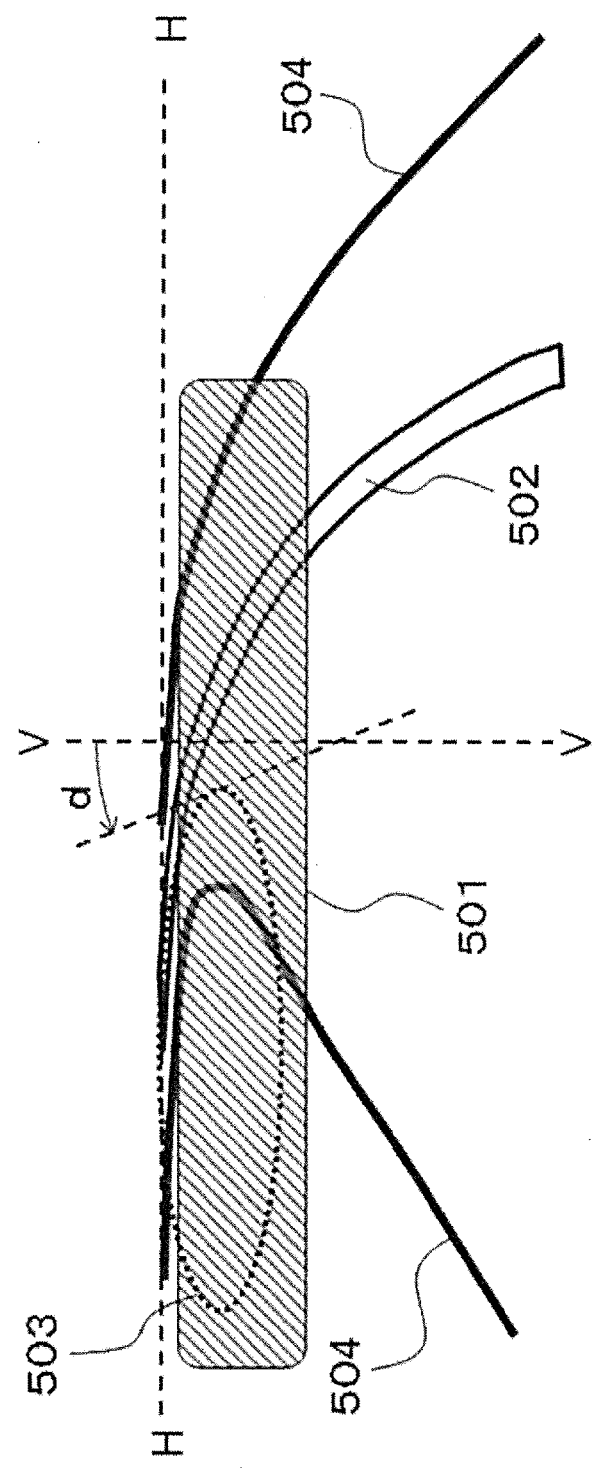
FIG. 19 is an explanatory diagram showing a light distribution pattern 501 of a headlight device with respect to a road 500.

FIG. 19 is a diagram showing a state in which the headlight device 100 is horizontally shifted the light distribution pattern 501. As shown in FIG. 18, when the light distribution pattern 501 is just returned to the horizontal attitude, the corner region 503 is illuminated by a peripheral part of the light distribution pattern 501. In FIG. 18, the headlight device 100 illuminates the corner region 503 with a left-hand side region of the light distribution pattern 501.

In an ordinary light distribution pattern 501, the central region of the pattern is bright. Therefore, when the light distribution pattern 501 is just returned to the horizontal attitude, the corner region 503 is illuminated by a dark part of the light distribution pattern 501.

The headlight device 100 is capable of not only compensating for the tilt of the vehicle body but also shifting the light distribution pattern 501 in the horizontal direction as shown in FIG. 19. In FIG. 19, the light distribution pattern 501 is shifted leftward compared to that in FIG. 18. The leftward in FIG. 19 is the direction that the corner region 503 exists.

By shifting the light distribution pattern 501 in the horizontal direction, a brighter visual field can be provided to the driver. In the following description, a "bright region" will be referred to as a high illuminance region.

In ordinary types of motorcycles, the headlight device is attached to the vehicle body or the handle bar. In the case where the headlight device is attached to the vehicle body, the headlight device mainly illuminates a region right in front of the vehicle body. In contrast, in the case where the headlight device is attached to the handle bar, the headlight device mainly illuminates a region in the direction of the handle bar which has been turned, and thus the region mainly illuminated by the headlight device shifts to the turning side. The headlight device 100 according to the present invention works effectively in either case.

The present invention relates to the headlight device 100 capable of compensating for the tilt of the vehicle body and also shifting the high illuminance region to the side of the tilt of the vehicle body as shown in FIG. 19, and relates to structure for realizing that.

<Configuration of Headlight Device 100>

Next, the configuration of the headlight device 100 will be described.

Figure 2:
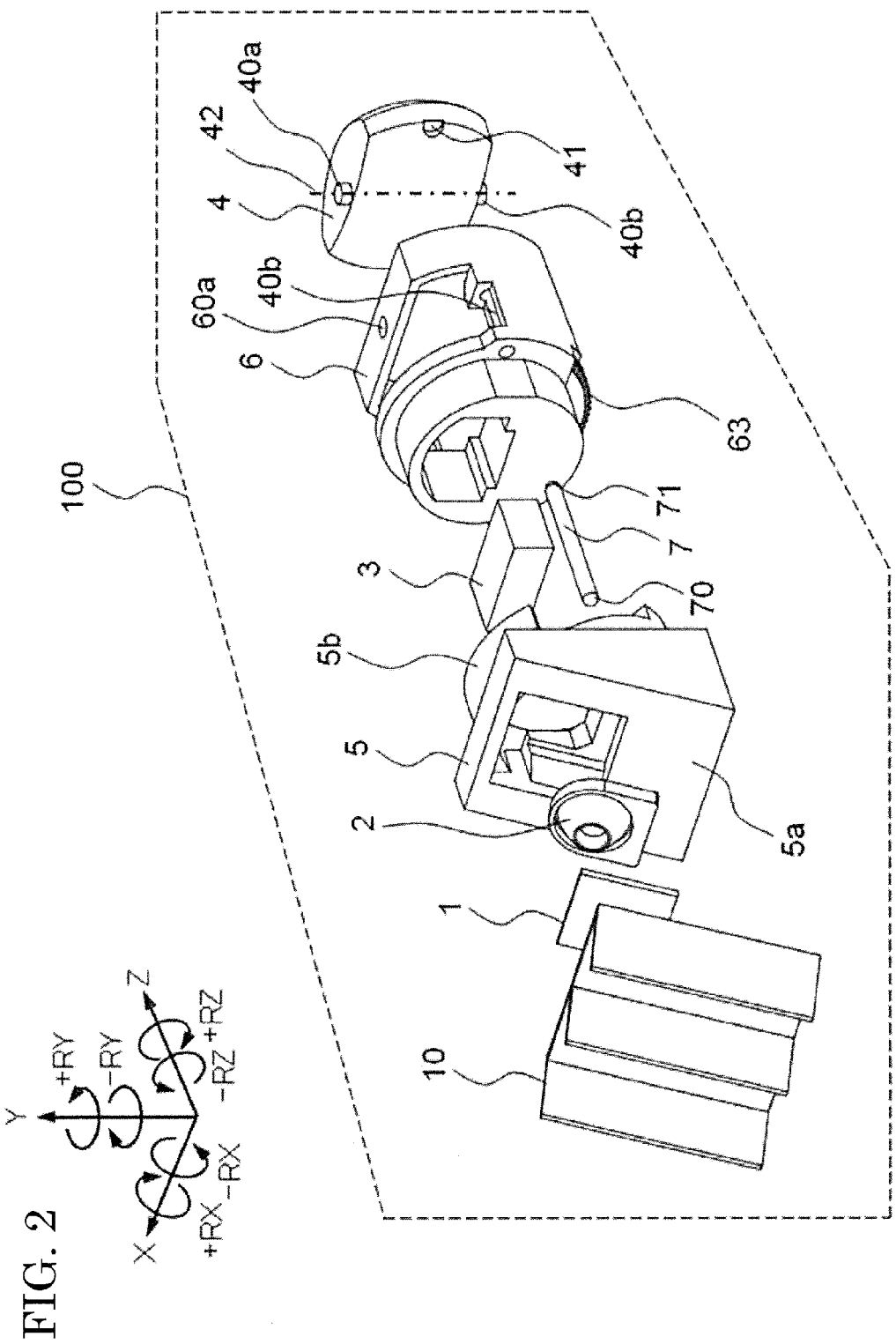
FIG. 2 is an exploded rear perspective view of the headlight device 100 according to the first embodiment.
Figure 3:
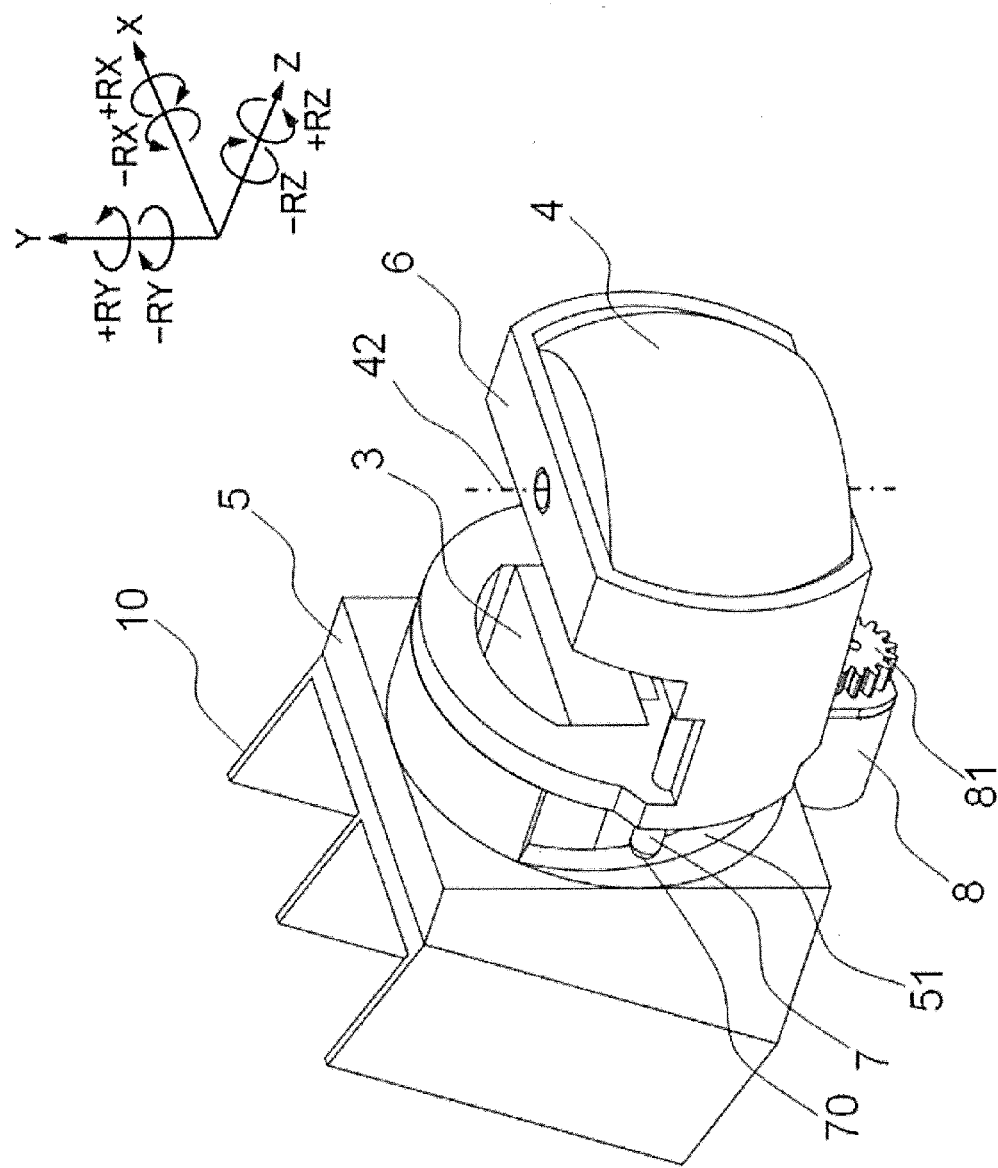
FIG. 3 is a front perspective view of the headlight device 100 according to the first embodiment in an assembled state.
Figure 4:
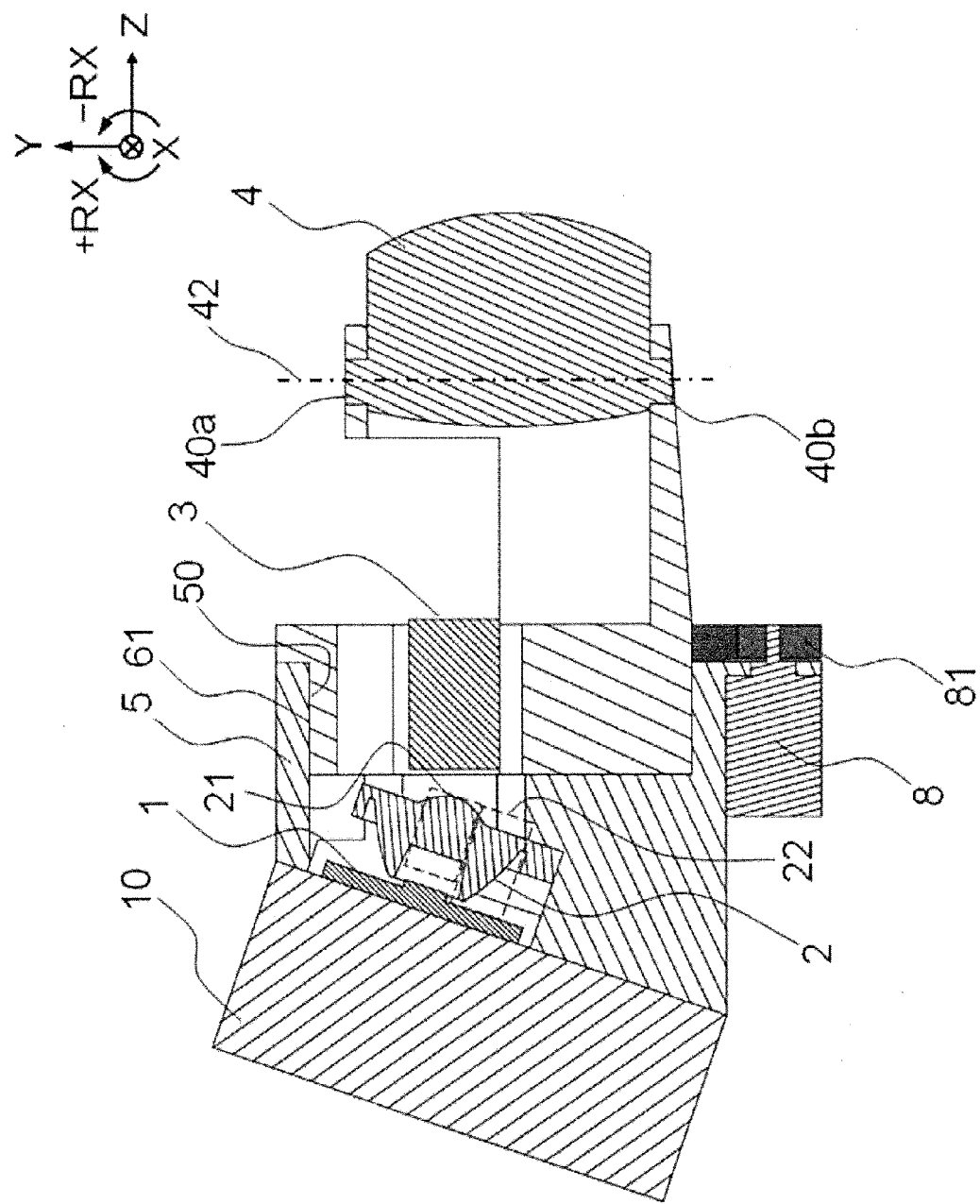
FIG. 4 is a sectional side view of the headlight device 100 according to the first embodiment.

FIG. 1 is an exploded front perspective view of the headlight device 100 according to the first embodiment. FIG. 2 is an exploded rear perspective view of the headlight device 100. FIG. 3 is a front perspective view of the headlight device 100 in an assembled state. FIG. 4 is a sectional side view of the headlight device 100.

The headlight device 100 includes a light source 1, a light guide member 3, a projection lens 4, a base member 5, a rotary member 6 and a slide shaft 7. The headlight device 100 may include a condensing lens 2, a drive source 8 or a radiator 10.

The light guide member 3 is an example of a light distribution formation member. The light distribution formation member is an optical member that converts the light emitted from the light source 1 into the light distribution pattern 501 described above.

The slide shaft 7 is an example of a slide member. The slide member is a member that makes the light distribution formation member and the projection lens 4 operate in conjunction with each other. The slide shaft 7 is also an example of a transmission member. The transmission member is a member that transmits a rotation amount of the rotary member 6 around a rotation axis 68 with respect to the base member 5 to the projection lens 4. Further, the slide shaft 7 and an inclined surface 51 are an example of a transmission mechanism 700.

The light source 1 emits light to serve as projection light. The projection light is light that illuminates ahead of the vehicle.

The light source 1 can be implemented by using a light-emitting diode (hereinafter referred to as an LED), an electroluminescence device or a laser diode, for example. The following explanation will be given assuming that the light source 1 is a light-emitting diode.

The light source 1 is equipped with the radiator 10 for releasing heat emitted from the light source 1 to the outside. In FIG. 1, the radiator 10 has three radiation fins. While the radiator 10 in FIG. 1 is formed in a shape having three radiation fins, the shape and structure of the radiation fins are not restricted to this. The radiator 10 is attached to the −Z-axis side of the light source 1.

The light source 1 may be directly fixed to the base member 5. Alternatively, the light source 1 may be fixed to the base member 5 via the radiator 10. In FIG. 1, the light source 1 is fixed to the base member 5 via the radiator 10.

The condensing lens 2 is a lens that condenses the light (projection light) emitted from the light source 1. Out of the light emitted from the light source 1, the condensing lens 2 condenses a light beam of a small emission angle by refracting the light beam with a refractive part 21 in the vicinity of the optical axis of the condensing lens 2. Out of the light emitted from the light source 1, the condensing lens 2 reflects a light beam of a large emission angle by reflecting the light beam with a reflective part 22 in the vicinity of the periphery of the condensing lens 2. In FIG. 4, the refractive part 21 and the reflective part 22 are indicated by surrounding them with broken lines.

Each light beam is condensed at an arbitrary position in front of (in the +Z-axis direction from) the condensing lens 2. The condensing lens 2 is fixed to the base member 5, for example.

Incidentally, the condensing lens 2 is not restricted to the configuration described above. However, in cases where an LED light source having a large divergence angle is used, employing a condensing lens having the above-described configuration makes it possible to condense light efficiently with a small-sized lens.

The light guide member 3 forms the light distribution pattern 501. In other words, the light guide member 3 transforms the incident light into the shape of the light distribution pattern 501. Put another way, the light guide member 3 is a light distribution formation member which forms the light distribution pattern of the light emitted from the light source 1.

The light guide member 3 is in the shape of a columnar body. The "columnar body" means a tubular spatial figure having two plane figures as its bases. Surfaces of the columnar body other than the bases will be referred to as a side face. The light guide member 3 is in the shape of a columnar body with bases in rectangular shapes, for example.

The light exiting from the condensing lens 2 enters the light guide member 3 through its incidence surface. The incidence surface and an exit surface are formed at surfaces corresponding to the bases of the columnar body shape. In FIG. 1, the incidence surface and the exit surface are surfaces parallel to the X-Y plane. While the incidence surface and the exit surface of the light guide member 3 are assumed here to be surfaces parallel to the X-Y plane, the shape of the light guide member 3 is not limited to this. For example, the incidence surface and the exit surface may be in shapes of curved surfaces.

The incident light is reflected by a reflecting surface and then exits from the exit surface. The reflecting surface is formed at a surface corresponding to the side face of the columnar body shape. Thus, the incident light is reflected by the reflecting surface formed at the side face and then exits from the exit surface. In FIG. 1, the reflecting surface is a surface parallel to the Z-X plane or the Y-Z plane.

The light guide member 3 is fixed to the rotary member 6. When the rotary member 6 rotates around the Z-axis, the light guide member 3 also rotates around the rotation axis 68 of the rotary member 6.

The projection lens 4 transmits the light emitted from the light source 1 and projects the light forward (in the +Z-axis direction).

The projection lens 4 projects the light distribution pattern formed by the light guide member 3 forward (in the +Z-axis direction) while magnifying the light distribution pattern.

The projection lens 4 is arranged on the +Z-axis direction side of the light guide member 3.

The projection lens 4 is provided on the rotary member 6. The projection lens 4 is arranged in front of (in the +Z-axis direction from) the light guide member 3.

The projection lens 4 has rotary pins 40a and 40b. When the rotary member 6 is positioned at a reference position with respect to the base member 5, the rotary pins 40a and 40b are shafts parallel to the Y-axis. The reference position of the rotary member 6 is the position of the rotary member 6 with respect to the base member 5 when the vehicle is traveling in a straight line. In other words, the rotary pin 40a and the rotary pin 40b are shafts coaxial with each other and parallel to the Y-axis. The rotary pins 40a and 40b form a rotation axis 42 parallel to the Y-axis.

The rotary pin 40a is formed on a surface of the projection lens 4 on the +Y-axis direction side of the projection lens 4. The rotary pin 40a is arranged at the central position of the projection lens 4 in the X-axis direction. The rotary pin 40a extends to the +Y-axis side.

The rotary pin 40b is formed on a surface of the projection lens 4 on the −Y-axis direction side of the projection lens 4. The rotary pin 40b is arranged at the central position of the projection lens 4 in the X-axis direction. The rotary pin 40a extends to the −Y-axis side.

The rotary pin 40a is inserted into a rotary hole 60a formed through the rotary member 6. The rotary pin 40b is inserted into a rotary hole 60b formed through the rotary member 6. The rotary holes 60a and 60b are holes parallel to the Y-axis when the rotary member 6 is at the reference position.

The rotary member 6 holds the projection lens 4 to be rotatable around the rotation axis 42. When the rotary member 6 rotates around the rotation axis 68, the projection lens 4 and the rotation axis 42 also rotate around the rotation axis 68 of the rotary member 6. In the first embodiment, the rotation axis 68 is an axis parallel to the Z-axis.

The projection lens 4 has a contact surface 41. In FIG. 1, the contact surface 41 is formed at an end of the projection lens 4 in the −X-axis direction. The contact surface 41 is formed in a central part of the projection lens 4 in the Y-axis direction. The contact surface 41 is formed on a surface of the projection lens 4 in the −Z-axis direction.

The contact surface 41 is in a concave shape open in the −Z-axis direction. Into the concave part of the contact surface 41, a tip end part of the slide shaft 7 on the +Z-axis direction side is inserted so as to contact the concave part. The tip end part of the slide shaft 7 on the +Z-axis direction side is a contactor 71.

Incidentally, the projection lens 4 is also usable for forming the light distribution pattern 501 by modifying the shape of the incidence surface or the exit surface.

The base member 5 holds the light source 1 and the condensing lens 2. Further, the base member 5 rotatably holds the rotary member 6.

The base member 5 has a plate-shaped part 5a and a cylinder-shaped part 5b.

The light source 1 and the radiator 10 are attached to a surface of the plate-shaped part 5a in the −Z-axis direction. The plate-shaped part 5a has a hole 54a that is open in the Z-axis direction. The hole 54a is a hole penetrating the plate-shaped part 5a. The condensing lens 2 is accommodated in the hole 54a. The cylinder-shaped part 5b is formed on a surface of the plate-shaped part 5a in the +Z-axis direction.

The cylinder-shaped part 5b is in a hollow tubular shape. The axis of the tubular shape is parallel to the Z-axis. An end of the hole 54a in the +Z-axis direction is situated in a hollow part 54b of the cylinder-shaped part 5b. A receiving surface 50 is formed on an inner surface of the cylinder-shaped part 5b. The light guide member 3 held by the rotary member 6 is accommodated in the hollow part 54b of the cylinder-shaped part 5b. The hollow part 54b is the space on the inside of the receiving surface 50.

The inclined surface 51 is formed on part of a surface of the cylinder-shaped part 5b in the +Z-axis direction. The inclined surface 51 has a helical shape around the Z-axis. For example, the inclined surface 51 is a surface facing the +Z-axis side of the base member 5. In FIG. 1, the inclined surface 51 is formed on the −X-axis side of the base member 5.

The helical shape is the shape of a curved line that ascends in a direction having a component orthogonal to the surface of revolution while rotating, such as a shape like a coil spring.

The inclined surface 51 is situated further in the +Z direction as it goes in the +RZ direction. The inclined surface 51 is in a helical shape on which the position shifts in the +Z-axis direction along with the rotation in the +RZ direction.

A contactor 70 of the slide shaft 7 is in contact with the inclined surface 51. The contactor 70 is a tip end part of the slide shaft 7 in the −Z-axis direction.

The rotary member 6 is rotatably held by the base member 5. The rotary member 6 holds the light guide member 3. Further, the rotary member 6 rotatably holds the projection lens 4.

The rotary member 6 is in a cylindrical shape as a whole. The light emitted from the light source 1 travels inside the cylindrical shape of the rotary member 6 in an axial direction. The axis of the cylindrical shape of the rotary member 6 is parallel to the Z-axis.

The rotary member 6 has a rotary surface 61. The rotary surface 61 is formed on an outer side face of the cylindrical shape of the rotary member 6. The rotary surface 61 is formed on the −Z-axis direction side of the rotary member 6.

The rotary surface 61 is inserted into the receiving surface 50 formed on the base member 5. The rotary surface 61 is in a cylindrical shape having an axis parallel to the Z-axis. Meanwhile, the receiving surface 50 is in a cylindrical shape having an axis parallel to the Z-axis. Thus, the directions of the central axes of the rotary surface 61 and the receiving surface 50 coincide with the Z-axis direction.

The rotary surface 61 (the side face of the cylindrical shape of the rotary member 6) is inserted so as to contact the side face of the cylindrical shape of the receiving surface 50. The base member 5 holds the rotary member 6 to be rotatable around the axis. Here, the "axis" means the axis of the cylinder-shaped receiving surface 50. When the rotary member 6 has been attached to the base member 5, the axis of the receiving surface 50 coincides with the axis of the cylinder-shaped rotary surface 61. The axis of the cylinder-shaped rotary surface 61 is identical with the rotation axis 68 of the rotary member 6.

The rotary member 6 and the base member 5 are provided with extraction stoppers (unshown) in order to prevent the translation of the rotary member 6 in the Z-axis direction with respect to the base member 5. The "translation" means parallel movement of points constituting a rigid body or the like in the same direction.

It is also possible to use a rolling bearing, roller, or the like as the means for having the base member 5 rotatably hold the rotary member 6. The "roller" is a roller having a rotation axis parallel to the Z-axis, for example. The roller, in place of the receiving surface 50, is provided on the surface of the plate-shaped part 5a of the base member 5 in the +Z-axis direction.

The rollers are arranged in the shape of a regular triangle, for example. The rotary member 6 is arranged so that the rotary surface 61 contacts the inside of the three rollers. The position of the rotary member 6 on the X-Y plane is determined and fixed by the three rollers. Since the three rollers rotate around their respective rotation axes, the rotary member 6 is rotatable around an axis (the rotation axis 68) parallel to the Z-axis. By use of the rollers, the rotary member 6 can be rotated with a simple configuration.

The rotary member 6 has the rotary holes 60a and 60b. The rotary holes 60a and 60b are formed through the side face of the rotary member 6. In FIG. 1, the rotary holes 60a and 60b are formed on the +Z-axis direction side of the rotary member 6.

As mentioned above, the rotary holes 60a and 60b are holes parallel to the Y-axis when the rotary member 6 is at the reference position with respect to the base member 5. The rotary hole 60a is formed on the +Y-axis side of the rotary member 6. The rotary hole 60b is formed on the −Y-axis side of the rotary member 6.

The axis formed by the rotary hole 60a and the rotary hole 60b is orthogonal to the rotation axis 68. In other words, the axis formed by the rotary hole 60a and the rotary hole 60b intersects with the rotation axis 68 at right angles.

The rotary member 6 includes a rack 63. The rack 63 is formed on the side face of the rotary member 6. In FIG. 1, the rack 63 is formed on the −Z-axis direction side of the rotary member 6. Further, the rack 63 is formed on the −Y-axis direction side of the rotary member 6.

The rack 63 is in the shape of an arc centering at the rotation axis 68 of the rotary member 6.

The rack 63 is in engagement with a pinion 81. The pinion 81 is attached to the drive source 8. The rack 63 receives turning force from the pinion 81 and rotates around the rotation axis 68 of the rotary member 6.

The rotary member 6 has a slide hole 62. Into the slide hole, the slide shaft 7 is inserted.

The slide hole 62 is formed along the side face of the rotary member 6. The slide hole 62 is formed on the −X-axis direction side of the rotary member 6, for example. The slide hole 62 is a hole extending in the Z-axis direction. In other words, the slide hole 62 is a hole parallel to the Z-axis.

The slide shaft 7 is a transmission member. The slide shaft 7, which is in contact with the projection lens 4, rotates the projection lens 4 around the rotation axis 42 according to the rotation of the rotary member 6 around the rotation axis 68 with respect to the base member 5.

The slide shaft 7 is inserted into the slide hole 62 formed through the rotary member 6. The rotary member 6 holds the slide shaft 7 to be translatable in the Z-axis direction. When the rotary member 6 rotates around the rotation axis 68, the slide shaft 7 also rotates around the rotation axis 68 of the rotary member 6.

The slide shaft 7 has the contactors 70 and 71 on its both ends. In FIG. 1, the contactors 70 and 71 are formed respectively in the both tip end parts of the slide shaft 7.

The both tip end parts of the slide shaft 7 (the contactors 70 and 71) are in hemispherical shapes, for example. Namely, the tip end part of the slide shaft 7 on the +Z-axis direction side and the tip end part of the slide shaft 7 on the −Z-axis direction side are in hemispherical shapes.

One end of the slide shaft 7 is in contact with the inclined surface 51 formed on the base member 5. The one end in contact with the inclined surface 51 is the end in the −Z-axis direction. The one end of the slide shaft 7 has the function of the contactor 70 to the inclined surface 51.

The other end of the slide shaft 7 is in contact with the contact surface 41 formed on the projection lens 4. The other end in contact with the contact surface 41 is the end in the +Z-axis direction. The other end of the slide shaft 7 has the function of the contactor 71 to the contact surface 41.

The drive source 8 is a direct-current motor, for example. Alternatively, the drive source 8 may be a stepping motor, an ultrasonic motor, or the like. The drive source 8 is fixed to the base member 5. In FIG. 1, for example, the drive source 8 is fixed on the −Y-axis direction side of the base member 5. The rotary shaft of the drive source 8 is parallel to the Z-axis.

The pinion 81 is attached to the rotary shaft of the drive source 8. Further, the rack 63 is provided on the bottom side (−Y-axis side) of the rotary member 6 as mentioned above. The pinion 81 is positioned to engage with the rack 63.

When the rotary shaft of the drive source 8 rotates in the +RZ direction, the rotary member 6 rotates in the −RZ direction. Similarly, when the rotary shaft of the drive source 8 rotates in the −RZ direction, the rotary member 6 rotates in the +RZ direction.

In the first embodiment, the rotary member 6 is rotated by using the pinion 81. However, the method of rotating the rotary member 6 is not limited to this. For example, the rotation of the rotary member 6 can be implemented by using a worm gear mechanism or a feed screw mechanism. The rotation of the rotary member 6 can also be implemented by using a belt and pulley. Further, the rotation of the rotary member 6 can also be implemented by using a link mechanism.

<Operation of Rotary Member 6 and Projection Lens 4>

The operation of the rotary member 6 and the projection lens 4 will be explained.

Figure 5:
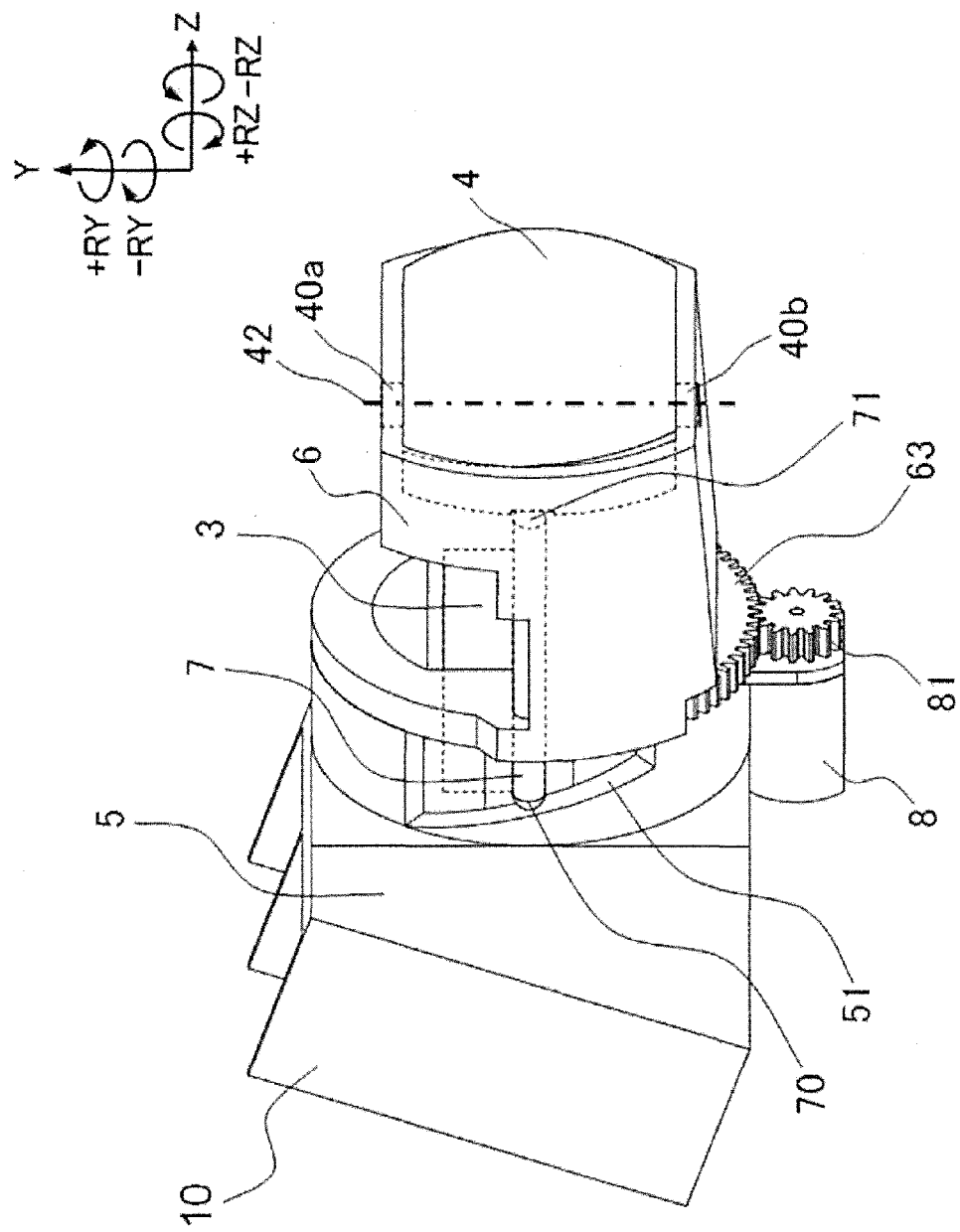
FIG. 5 is a schematic diagram for explaining rotary operation of a rotary member 6 and operation of a projection lens 4 in the headlight device 100 according to the first embodiment.
Figure 6:
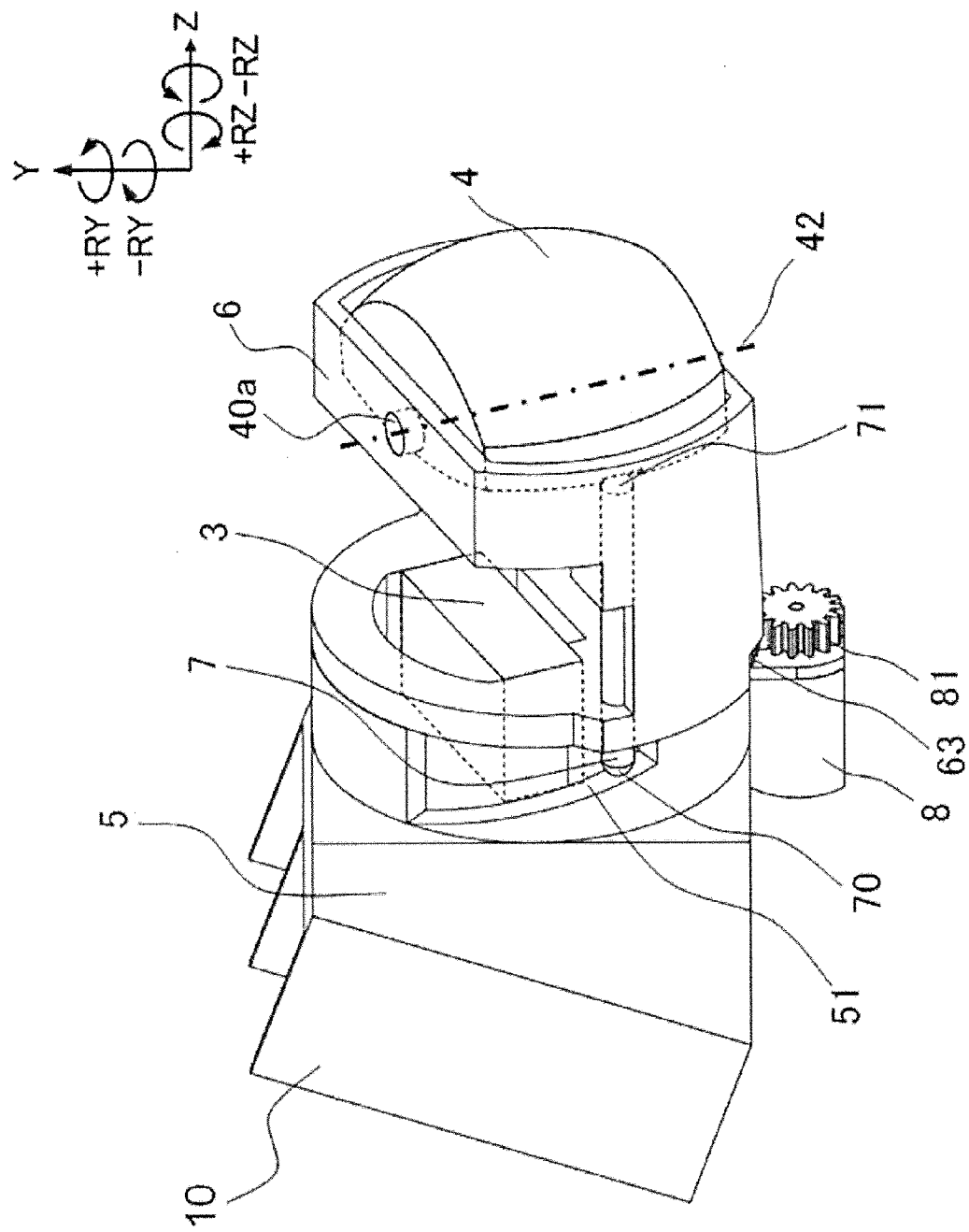
FIG. 6 is a schematic diagram for explaining the rotary operation of the rotary member 6 and the operation of the projection lens 4 in the headlight device 100 according to the first embodiment.
Figure 7:
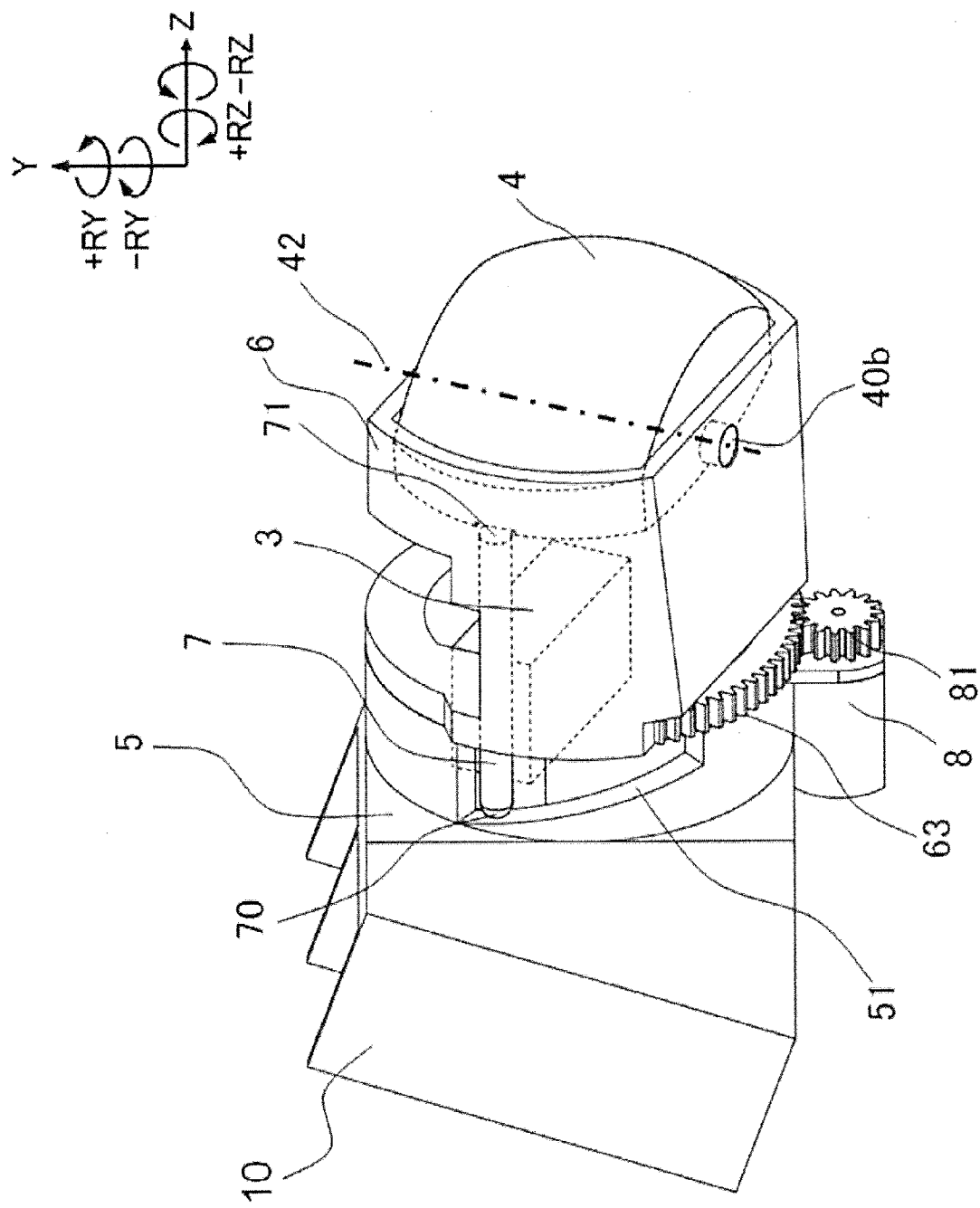
FIG. 7 is a schematic diagram for explaining the rotary operation of the rotary member 6 and the operation of the projection lens 4 in the headlight device 100 according to the first embodiment.

FIGS. 5-7 are schematic diagrams for explaining the rotary operation of the rotary member 6 and the operation of the projection lens 4.

FIG. 5 is a schematic diagram of the headlight device 100 in a case where the motorcycle 95 travels in a straight line. In other words, FIG. 5 is a schematic diagram of the headlight device 100 showing a state in which the motorcycle 95 is not tilted. Thus, in FIG. 5, the rotary member 6 is positioned at the reference position with respect to the base member 5.

In the headlight device 100 when the motorcycle 95 travels in a straight line, the top surface of the light guide member 3 is parallel to the Z-X plane, for example. Further, the rotation axis 42 of the rotary pins 40a and 40b of the projection lens 4 is parallel to the Y-axis. Furthermore, the projection lens 4 is pointed in the forward direction (+Z-axis direction). In other words, the optical axis of the projection lens 4 is parallel to the Z-axis.

FIG. 6 is a schematic diagram of the headlight device 100 in a case where the motorcycle 95 travels while turning leftward. In other words, FIG. 6 is a schematic diagram of the headlight device 100 showing a state in which the motorcycle 95 is tilted leftward with respect to the traveling direction.

When the motorcycle 95 tilts leftward with respect to the traveling direction (+Z-axis direction), the pinion 81 rotates in the −RZ direction according to the tilt angle d. Namely, the drive source 8 rotates the pinion 81 in the −RZ direction. Due to the rotary movement of the pinion 81, the rack 63 receives turning force from the pinion 81. Due to the turning force received by the rack 63, the rotary member 6 rotates in the +RZ direction.

The light guide member 3 and the projection lens 4 are respectively provided on the rotary member 6. The light guide member 3 forms the light distribution pattern 501. The projection lens 4 magnifies and projects the incident light. Incidentally, the projection lens 4 is also capable of forming the light distribution pattern 501.

When the rotary member 6 rotates in the +RZ direction, the light distribution pattern 501 also rotates in the +RZ direction accordingly. In reality, the base member 5 is fixed to the motorcycle 95. Thus, the base member 5 tilts in the same direction (bank direction) as the tilt of the vehicle body. The bank direction in cases where the motorcycle 95 travels while turning leftward is the −RZ direction.

The base member 5 tilts by the same angle as the tilt angle d of the vehicle body. So as to compensate for the tilt of the base member 5, the rotary member 6 rotates in a direction (+RZ direction) opposite to the direction of the tilt of the vehicle body (bank direction). Thus, the rotary member 6 does not tilt in the left and right direction even when the vehicle body tilts. This allows the light distribution pattern 501 to remain in the horizontal attitude similarly to the cases where the motorcycle 95 travels in a straight line.

The driver is enabled to illuminate a distant region on the turning side (the corner region 503) with the headlight device 100 even when the vehicle body is tilted leftward with respect to the traveling direction.

In FIG. 6, the light guide member 3 and the projection lens 4 are rotated in the +RZ direction. In other words, the light guide member 3 and the projection lens 4 are tilted rightward. In reality, however, the light guide member 3 and the projection lens 4 remain in the horizontal attitude since the base member 5 is tilted leftward (−RZ direction).

Further, when the rotary member 6 rotates in the +RZ direction with respect to the base member 5 in cases of traveling while turning leftward, the slide shaft 7 also rotates in the same way as the rotary member 6. The slide shaft 7 is provided on the rotary member 6.

A spring (unshown) is connected between the projection lens 4 and the rotary member 6 so that the slide shaft 7 and the inclined surface 51 remain in constant contact with each other. By the spring, the slide shaft 7 and the inclined surface 51 are kept in constant contact with each other.

The spring is provided so as to cause the projection lens 4 to rotate in the −RY direction. Specifically, in FIG. 1, the spring causes the projection lens 4 to start rotating in the −RY direction with respect to the rotary member 6. Then, from the projection lens 4, the slide shaft 7 receives force in the −Z-axis direction with respect to the rotary member 6. Accordingly, the slide shaft 7 remains in constant contact with the inclined surface 51.

The spring is, for example, a compression spring arranged on the +X-axis direction side or a tension spring arranged on the −X-axis direction side.

The contactor 70 is in contact with the inclined surface 51 due to the spring force applied to the projection lens 4. The contactor 71 is in contact with the contact surface 41 due to the spring force applied to the projection lens 4.

The inclined surface 51 has the helical shape around the Z-axis. The inclined surface 51 is the surface facing the +Z-axis side of the base member 5. The inclined surface 51 is formed on the −X-axis side of the base member 5.

The inclined surface 51 has the helical shape around the Z-axis. The inclined surface 51 is situated further in the +Z direction as it goes in the +RZ direction.

Thus, when the rotary member 6 rotates in the +RZ direction, the position of contact between the contactor 70 and the inclined surface 51 shifts in the +Z direction. Accordingly, the slide shaft 7 moves in the +Z direction. Accordingly, the position of contact between the contactor 71 and the contact surface 41 shifts in the +Z direction.

Due to the movement of the slide shaft 7 in the +Z direction, the projection lens 4 rotates around the rotary pins 40a and 40b as the rotation axis 42. The projection lens 4 rotates to turn to the left. In other words, the projection lens 4 rotates in the +RY direction.

As a result, the "bright region" in the light distribution pattern 501 moves to the corner region 503.

FIG. 7 is a schematic diagram of the headlight device 100 in a case where the motorcycle 95 travels while turning rightward. In other words, FIG. 7 is a schematic diagram of the headlight device 100 showing a state in which the motorcycle 95 is tilted rightward with respect to the traveling direction.

When the motorcycle 95 tilts rightward with respect to the traveling direction (+Z-axis direction), the pinion 81 rotates in the +RZ direction according to the tilt angle d. Namely, the drive source 8 rotates the pinion 81 in the +RZ direction. Due to the rotary movement of the pinion 81, the rack 63 receives turning force from the pinion 81. Due to the turning force received by the rack 63, the rotary member 6 rotates in the −RZ direction.

The light guide member 3 and the projection lens 4 are respectively provided on the rotary member 6. The light guide member 3 forms the light distribution pattern 501. The projection lens 4 magnifies and projects the incident light. Incidentally, the projection lens 4 is also capable of forming the light distribution pattern 501.

When the rotary member 6 rotates in the −RZ direction, the light distribution pattern 501 also rotates in the −RZ direction accordingly. In reality, the base member 5 is fixed to the motorcycle 95. Thus, the base member 5 tilts in the same direction (bank direction) as the tilt of the vehicle body. The bank direction in cases where the motorcycle 95 travels while turning rightward is the +RZ direction.

The base member 5 tilts by the same angle as the tilt angle d of the vehicle body. So as to compensate for the tilt of the base member 5, the rotary member 6 rotates in a direction (−RZ direction) opposite to the direction of the tilt of the vehicle body (bank direction). Thus, the rotary member 6 does not tilt in the left and right direction even when the vehicle body tilts. This allows the light distribution pattern 501 to remain in the horizontal attitude similarly to the cases where the motorcycle 95 travels in a straight line.

The driver is enabled to illuminate a distant region on the turning side (the corner region 503) with the headlight device 100 even when the vehicle body is tilted rightward with respect to the traveling direction.

In FIG. 7, the light guide member 3 and the projection lens 4 are rotated in the −RZ direction. In other words, the light guide member 3 and the projection lens 4 are tilted leftward. In reality, however, the light guide member 3 and the projection lens 4 remain in the horizontal attitude since the base member 5 is tilted rightward (+RZ direction).

Further, when the rotary member 6 rotates in the −RZ direction with respect to the base member 5 in cases of traveling while turning rightward, the slide shaft 7 also rotates in the same way as the rotary member 6. The slide shaft 7 is provided on the rotary member 6.

As mentioned above, the contactor 70 is in contact with the inclined surface 51 due to the spring force applied to the projection lens 4. The contactor 71 is in contact with the contact surface 41 due to the spring force applied to the projection lens 4.

The inclined surface 51 has the helical shape around the Z-axis. The inclined surface 51 is situated further in the −Z direction as it goes in the −RZ direction.

Thus, when the rotary member 6 rotates in the −RZ direction, the position of contact between the contactor 70 and the inclined surface 51 shifts in the −Z direction. Accordingly, the slide shaft 7 moves in the −Z direction. Accordingly, the position of contact between the contactor 71 and the contact surface 41 shifts in the −Z direction.

Due to the movement of the slide shaft 7 in the −Z direction, the projection lens 4 rotates around the rotary pins 40a and 40b as the rotation axis 42. The projection lens 4 rotates to turn to the right. In other words, the projection lens 4 rotates in the −RY direction.

As a result, the "bright region" in the light distribution pattern 501 moves to the corner region 503.

Incidentally, the rotation amount of the rotary member 6 by the drive source 8 is set at the tilt angle d of the vehicle body. However, the rotation amount of the rotary member 6 is not limited to this. Depending on the traveling status, the adjustment angle of the tilt of the headlight device according to the tilt of the vehicle body may be modified.

Specifically, there are cases where the adjustment for constantly keeping the light distribution pattern 501 in parallel with the ground surface is unnecessary. The rotation angle may be set at any desired angle. For example, the rotary member 6 may be rotated by an angle larger than the tilt angle d. This makes it possible to intentionally tilt the light distribution pattern as needed rather than constantly keeping the light distribution pattern in the horizontal attitude.

For example, the driver's check in the traveling direction of the vehicle can be facilitated by tilting the light distribution pattern to elevate the light distribution on the corner region 503's side. At left corner, the dazzling of oncoming vehicles by the projection light can be reduced by tilting the light distribution pattern to lower the light distribution on the side opposite to the corner region 503.

There is no problem even if the rotary operation of the rotary member 6 is not continuous but discontinuous. Further, there is no problem even if the rotary operation of the rotary member 6 is not proportional to the tilt of the vehicle body but stepwise changes.

The rotation amount of the projection lens 4 according to the rotary operation of the rotary member 6 can be modified by changing the shape of the inclined surface 51. Further, the timing of the rotation of the projection lens 4 according to the rotary operation of the rotary member 6 can be modified by changing the shape of the inclined surface 51. Thus, by changing the shape of the inclined surface 51, the tilt of the light distribution pattern 501 with respect to the ground surface (road surface) can be modified.

The headlight device 100 includes the light source 1, the base member 5, a light distribution formation member 3, the rotary member 6, the projection lens 4 and the transmission mechanism 700.

In the first embodiment, the light distribution formation member 3 is described as the light guide member 3, for example.

In the first embodiment, the transmission mechanism 700 includes the slide shaft 7 and the inclined surface 51, for example.

The light source 1 emits light. The base member 5 holds the light source 1. The light distribution formation member 3 receives incident light and forms the light distribution pattern 501 of the light.

The rotary member 6, holding the light distribution formation member 3, is held by the base member 5 to be rotatable around a first rotation axis 68.

In the first embodiment, the first rotation axis 68 coincides with the traveling direction of the light passing through the light guide member 3.

The projection lens 4 receives incident light with which the light distribution pattern 501 has been formed and emits the light as the projection light. The projection lens 4 is held by the rotary member 6 to be rotatable around a second rotation axis 42 that is orthogonal to the first rotation axis 68.

The second rotation axis 42 extends in a direction corresponding to the up-and-down direction of the light distribution pattern 501 of the projection light.

The transmission mechanism 700 includes the transmission member 7 which transmits the rotation amount of the rotary member 6 around the first rotation axis 68 with respect to the base member 5 to the projection lens 4. The transmission mechanism 700 rotates the projection lens 4 around the second rotation axis 42 according to the rotation of the rotary member 6 with respect to the base member 5.

In the first embodiment, the transmission member 7 is described as the slide shaft 7, for example.

In the first embodiment, the transmission member 7 is in contact with the projection lens 4 at one end.

In the case where the vehicle equipped with the headlight device 100 projects the projection light while traveling in a straight line, the direction orthogonal to the road surface is regarded as the up-and-down direction of the light distribution pattern of the projection light.

The rotary member 6 rotates around the first rotation axis 68 so as to rotate the light distribution pattern 501 of the projection light in the direction opposite to the direction in which the light distribution pattern 501 of the projection light tilts due to the tilt of the attitude of the base member 5. The projection lens 4 rotates in the left-and-right direction of the light distribution pattern 501 of the projection light to turn toward the direction in which the light distribution pattern 501 of the projection light tilts.

The transmission mechanism 700 includes a cam 51.

In the first embodiment, the cam 51 is described as the inclined surface 51.

By the rotation of the rotary member 6 around the first rotation axis 68, the position of the connection between the transmission member 7 and the cam 51 is changed, by which the projection lens 4 is rotated around the second rotation axis 42.

The transmission member 7 is held by the rotary member 6 and is moved in the direction of the first rotation axis 68 by the cam 51 formed on the base member 5.

The transmission member 7 is a shaft.

The headlight device 100 is mounted on a vehicle, and the direction in which the vehicle tilts in its left-and-right direction coincides with the direction in which the light distribution pattern 501 of the projection light tilts.

<First Modification>

Figure 8:
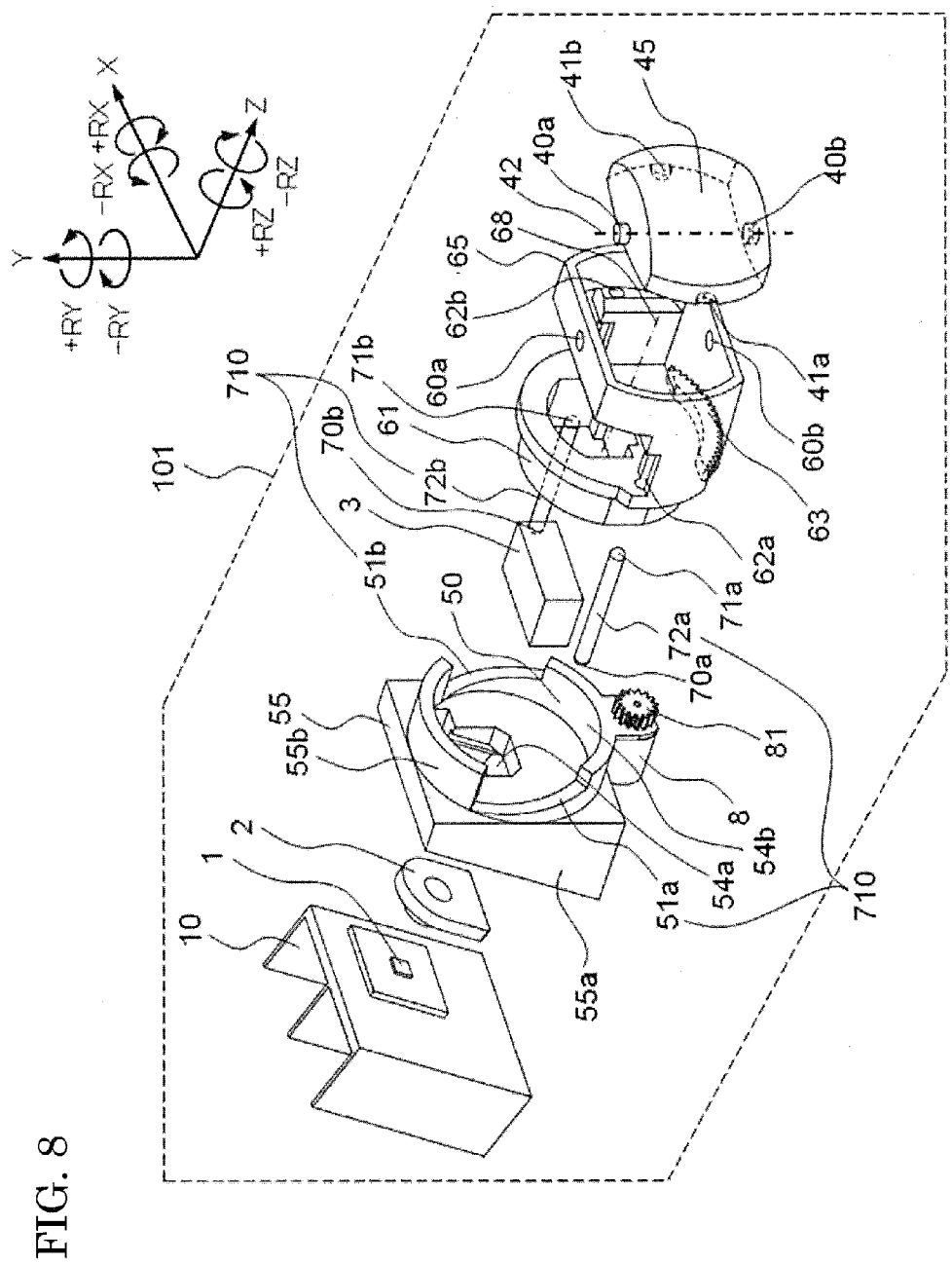
FIG. 8 is an exploded front perspective view of a headlight device 101 according to the first embodiment.

FIG. 8 is an exploded front perspective view of a headlight device 101. The headlight device 101 is configured without using the spring connecting the projection lens 4 and the rotary member 6.

First, the configuration of the headlight device 101 will be described below.

A base member 55 differs from the base member 5 in having two inclined surfaces 51. The rest of the configuration of the base member 55 is identical with that of the base member 5.

The base member 55 has a plate-shaped part 55a and a cylinder-shaped part 55b.

The light source 1 and the radiator 10 are attached to a surface of the plate-shaped part 55a in the −Z-axis direction. The plate-shaped part 55a has a hole 54a that is open in the Z-axis direction. The hole 54a is a hole penetrating the plate-shaped part 55a. The condensing lens 2 is accommodated in the hole. The cylinder-shaped part 55b is formed on a surface of the plate-shaped part 55a in the +Z-axis direction.

The cylinder-shaped part 55b is in a hollow tubular shape. The axis of the tubular shape is parallel to the Z-axis. An end of the hole 54a in the +Z-axis direction is situated in a hollow part 54b of the cylinder-shaped part 55b. A receiving surface 50 is formed on an inner surface of the cylinder-shaped part 55b. The light guide member 3 held by a rotary member 65 is accommodated in the hollow part 54b of the cylinder-shaped part 55b. The hollow part 54b is the space on the inside of the receiving surface 50.

The base member 55 has an inclined surface 51a and an inclined surface 51b. The inclined surfaces 51a and 51b are formed on parts of the surface of the cylinder-shaped part 55b in the +Z-axis direction.

The inclined surface 51a has a helical shape around the Z-axis. For example, the inclined surface 51a is a surface facing the +Z-axis side of the base member 5. The inclined surface 51a is formed on the −X-axis side of the base member 5. The inclined surface 51a is situated further in the +Z direction as it goes in the +RZ direction. The inclined surface 51a is in a helical shape on which the position shifts in the +Z-axis direction along with the rotation in the +RZ direction.

The inclined surface 51b has a helical shape around the Z-axis. For example, the inclined surface 51b is a surface facing the +Z-axis side of the base member 5. The inclined surface 51b is formed on the +X-axis side of the base member 5. The inclined surface 51b is situated further in the +Z direction as it goes in the −RZ direction. The inclined surface 51b is in a helical shape on which the position shifts in the +Z-axis direction along with the rotation in the −RZ direction.

The rotary member 65 differs from the rotary member 6 in having two slide holes 62a and 62b. The rest of the configuration of the rotary member 65 is identical with that of the rotary member 6.

The rotary member 65 has the slide hole 62a and the slide hole 62b. The slide holes 62a and 62b are formed along the side face of the rotary member 65. The slide holes 62a and 62b are arranged on opposite sides to each other with respect to the rotation axis 68 of the rotary member 65. In FIG. 8, the slide holes 62a and 62b are arranged symmetrically with respect to the rotation axis 68 of the rotary member 65.

For example, the slide hole 62a is formed along the side face of the rotary member 65 on the −X-axis direction side. The slide hole 62b is formed along the side face of the rotary member 65 on the +X-axis direction side.

The slide holes 62a and 62b are holes extending in the Z-axis direction. In other words, the slide holes 62a and 62b are holes parallel to the Z-axis.

The shape of each slide shaft 72a, 72b is identical with that of the slide shaft 7. The headlight device 101 differs from the headlight device 100 in having two slide shafts 72a and 72b.

The slide shafts 72a and 72b are transmission members. The slide shafts 72a and 72b, which are in contact with a projection lens 45, rotate the projection lens 45 around the rotation axis 42 according to the rotation of the rotary member 65 around the rotation axis 68 with respect to the base member 55. The slide shafts 72a and 72b and the inclined surfaces 51a and 51b are an example of a transmission mechanism 710.

The slide shaft 72a is inserted into the slide hole 62a formed through the rotary member 65. The slide shaft 72b is inserted into the slide hole 62b formed through the rotary member 65. The rotary member 65 respectively holds the slide shafts 72a and 72b to be translatable in the Z-axis direction. When the rotary member 65 rotates around the rotation axis 68, the slide shafts 72a and 72b also rotate around the rotation axis 68 of the rotary member 65.

The slide shaft 72a has contactors 70a and 71a on its ends. The slide shaft 72b has contactors 70b and 71b on its ends. In FIG. 8, the contactors 70a and 71a are formed in the tip end parts of the slide shaft 72a, and the contactors 70b and 71b are formed in the tip end parts of the slide shaft 72b.

The tip end parts of the slide shafts 72a and 72b (the contactors 70a, 71a, 70b and 71b) are in hemispherical shapes, for example. In other words, the both tip end parts of each slide shaft 72a, 72b on the +Z-axis direction side and the both tip end parts of each slide shaft 72a, 72b on the −Z-axis direction side are in hemispherical shapes.

One end of the slide shaft 72a is in contact with the inclined surface 51a formed on the base member 55. The other end of the slide shaft 72a is in contact with a contact surface 41a formed on the projection lens 45.

One end of the slide shaft 72b is in contact with the inclined surface 51b formed on the base member 55. The other end of the slide shaft 72b is in contact with a contact surface 41b formed on the projection lens 45.

One end of the slide shaft 72a has the function of the contactor 70a to the inclined surface 51a. The other end of the slide shaft 72a has the function of the contactor 71a to the contact surface 41a.

One end of the slide shaft 72b has the function of the contactor 70b to the inclined surface 51b. The other end of the slide shaft 72b has the function of the contactor 71b to the contact surface 41b.

The projection lens 45 differs from the projection lens 4 in having the two contact surfaces 41a and 41b. The rest of the configuration of the projection lens 45 is identical with that of the projection lens 4.

The projection lens 45 has the two contact surfaces 41a and 41b.

In FIG. 8, the contact surface 41a is formed at an end of the projection lens 45 in the −X-axis direction. The contact surface 41a is formed in a central part of the projection lens 45 in the Y-axis direction. The contact surface 41a is formed on a surface of the projection lens 45 in the −Z-axis direction.

The contact surface 41a is in a concave shape open in the −Z-axis direction. Into the concave part of the contact surface 41a, a tip end part of the slide shaft 72a on the +Z-axis direction side is inserted so as to be in contact with the concave part. The tip end part of the slide shaft 72a on the +Z-axis direction side is the contactor 71a.

In FIG. 8, the contact surface 41b is formed at an end of the projection lens 45 in the +X-axis direction. The contact surface 41b is formed in a central part of the projection lens 45 in the Y-axis direction. The contact surface 41b is formed on a surface of the projection lens 45 in the −Z-axis direction.

The contact surface 41b is in a concave shape open in the −Z-axis direction. Into the concave part of the contact surface 41b, a tip end part of the slide shaft 72b on the +Z-axis direction side is inserted so as to be in contact with the concave part. The tip end part of the slide shaft 72b on the +Z-axis direction side is the contactor 71b.

Next, the operation of the headlight device 101 will be described.

When the motorcycle 95 travels while turning leftward, the rotary member 65 receives driving force from the drive source 8 and rotates in the +RZ direction. The slide shaft 72a also rotates in the +RZ direction in the same way. By the inclined surface 51a, the slide shaft 72a is moved in the +Z-axis direction. Due to the movement of the slide shaft 72a in the +Z-axis direction, the projection lens 45 rotates around the rotary pins 40a and 40b as the rotation axis 42 to turn to the left (+X-axis direction side). In other words, the projection lens 45 rotates in the +RY direction around the rotary pins 40a and 40b as the rotation axis 42.

In this case, due to the rotary movement of the projection lens 45, the slide shaft 72b is pushed and moves in the −Z-axis direction. The inclined surface 51b is inclined in the −Z-axis direction to be suitable for the amount of the movement of the slide shaft 72b in the −Z-axis direction. Thus, the slide shaft 72b's position of contact on the inclined surface 51b shifts in the −Z-axis direction according to the rotation of the rotary member 65. Therefore, the inclined surface 51b does not impede the movement of the slide shaft 72b in the −Z-axis direction.

When the motorcycle 95 travels while turning rightward, the rotary member 65 receives driving force from the drive source 8 and rotates in the −RZ direction. The slide shaft 72a also rotates in the −RZ direction in the same way. By the inclined surface 51b, the slide shaft 72b is moved in the +Z-axis direction. Due to the movement of the slide shaft 72b in the +Z-axis direction, the projection lens 45 rotates around the rotary pins 40a and 40b as the rotation axis 42 to turn to the right (−X-axis direction side). In other words, the projection lens 45 rotates in the −RY direction around the rotary pins 40a and 40b as the rotation axis 42.

In this case, due to the rotary movement of the projection lens 45, the slide shaft 72a is pushed and moves in the −Z-axis direction. The inclined surface 51a is inclined in the −Z-axis direction to be suitable for the amount of the movement of the slide shaft 72a in the −Z-axis direction. Thus, the slide shaft 72a's position of contact on the inclined surface 51a shifts in the −Z-axis direction according to the rotation of the rotary member 65. Therefore, the inclined surface 51a does not impede the movement of the slide shaft 72a in the −Z-axis direction.

The transmission mechanism 710 includes transmission members 72a and 72b which transmit the rotation amount of the rotary member 65 around the first rotation axis 68 with respect to the base member 55 to the projection lens 45. The transmission mechanism 710 rotates the projection lens 45 around the second rotation axis 42 according to the rotation of the rotary member 65 with respect to the base member 55.

In the first modification, the transmission members 72a and 72b are described to include the slide shafts 72a and 72b, for example.

The transmission mechanism 710 includes cams 51a and 51b. In the first modification, the cams 51a and 51b are described as the inclined surfaces 51a and 51b, for example.

<Second Modification>

Figure 9:
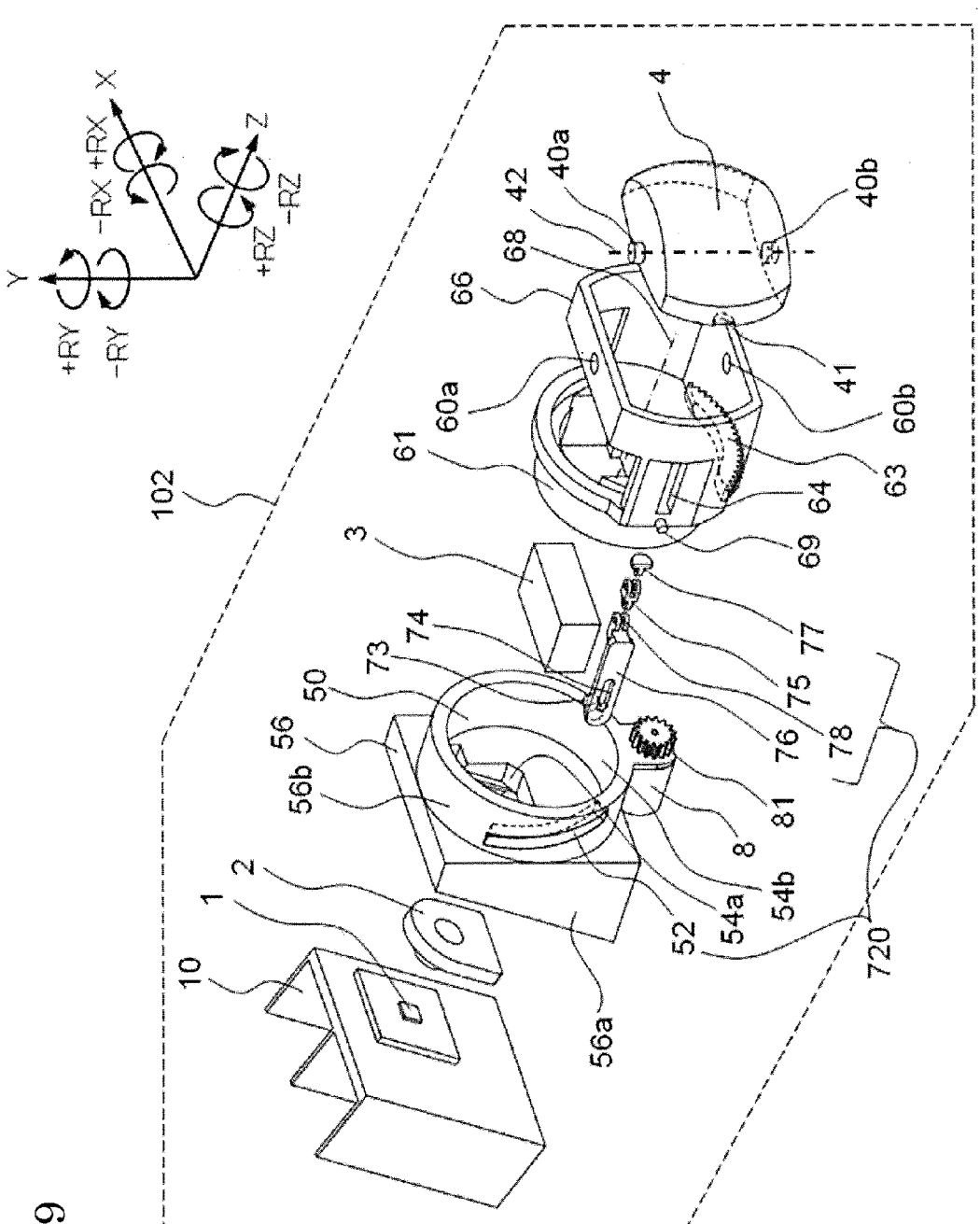
FIG. 9 is an exploded front perspective view of a headlight device 102 according to the first embodiment.

FIG. 9 is an exploded front perspective view of a headlight device 102. The headlight device 102 is configured without using the spring connecting the projection lens 4 and the rotary member 6.

First, the configuration of the headlight device 102 will be described.

The projection lens 4 has a contact surface 41. The contact surface 41 is formed at an end of the projection lens 4 in the −X-axis direction. The contact surface 41 is formed in a central part of the projection lens 4 in the Y-axis direction. The contact surface 41 is formed on a surface of the projection lens 4 in the −Z-axis direction.

A base member 56 differs from the base member 5 in having a cam groove 52 instead of the inclined surface 51. The rest of the configuration of the base member 56 is identical with that of the base member 5.

The base member 56 has the cam groove 52. Thus, the base member 56 does not have the inclined surface 51 of the base member 5. The cam groove 52 is formed along the side face of a cylinder-shaped part 56b of the base member 56.

In FIG. 9, the cam groove 52 is formed along the side face of the cylinder-shaped part 56b on the −X-axis side, for example. The cam groove 52 has a helical shape around the Z-axis. The cam groove 52 is in a helical shape advancing in the +Z-axis direction along with the rotation in the +RZ direction. In other words, the position of the cam groove 52 shifts in the +Z-axis direction as it goes in the +RZ direction on the side face of the cylinder-shaped part 56b. The cam groove 52 is in a helical shape on which the position shifts in the +Z-axis direction along with the rotation in the +RZ direction.

A rotary member 66 differs from the rotary member 6 in having a slide groove 64 and a slide pin 69 instead of the slide hole 62. The rest of the configuration of the rotary member 66 is identical with that of the rotary member 6.

The rotary member 66 has the slide groove 64 and the slide pin 69.

The slide groove 64 is formed along the side face of the rotary member 66. For example, the slide groove 64 is formed on the −X direction side of the rotary member 66.

The slide pin 69 is formed on the side face of the rotary member 66. For example, the slide pin 69 is formed on the −X direction side of the rotary member 66. The slide pin 69 is arranged at the same position on the rotary member 66 as the slide groove 64. In FIG. 9, the slide pin 69 is arranged on the −Z-axis direction side of the slide groove 64.

A slide shaft 76 is an example of the transmission member. The slide shaft 76 is also an example of the slide member. The slide shaft 76 can be made of a plate material. The slide shaft 76, which connects to the projection lens 4, rotates the projection lens 4 around the rotation axis 42 according to the rotation of the rotary member 66 with respect to the base member 56. The slide shaft 76, a link 75, a connection member 77 and the cam groove 52 are an example of a transmission mechanism 720.

The slide shaft 76 has a slide groove 74. The slide groove 74 is a groove extending in the Z-axis direction.

The link 75 is connected to a tip end part 78 of the slide shaft 76 on the +Z-axis side. The link 75 is held to be rotatable with respect to the slide shaft 76 around the Y-axis.

The connection member 77 is connected to a tip end part of the link 75 on the +Z-axis side. The connection member 77 is held to be rotatable with respect to the link 75 around the Y-axis. A surface of the connection member 77 on the +Z side is connected to the contact surface 41 formed on the projection lens 4.

Incidentally, it is also possible to provide the connection member 77 directly on the contact surface 41 formed on the projection lens 4. For example, by forming a shape similar to the connection member 77 on the contact surface 41, an equivalent function can be achieved without using the connection member 77 or the contact surface 41. Further, by having the connection member 77 held to be movable in the X-axis direction with respect to the projection lens 4, an equivalent function can be achieved without using the link 75. This includes a case where the connection member 77 is connected to the projection lens 4 to be movable in the X-axis direction, for example.

A slide pin 73 is provided at the other end (on the −Z-axis side) of the slide shaft 76. The slide pin 73 is arranged on the −Z-axis direction side of the slide groove 74. The slide pin 73 is a shaft parallel to the X-axis. The slide pin 73 is provided on a surface of the slide shaft 76 on the +X-axis direction side. The slide pin 73 extends in the +X-axis direction.

The tip end part 78 of the slide shaft 76 on the +Z-axis side is inserted into the slide groove 64. The tip end part 78, the link 75 and the connection member 77 are configured to be accommodated in the slide groove 64.

The slide pin 69 is inserted into the slide groove 74. The slide pin 69 is provided on the rotary member 66. Thus, the slide shaft 76 is held to be translatable in the Z-axis direction with respect to the rotary member 66. The slide shaft 76 is capable of translating in the Z-axis direction with respect to the rotary member 66.

The slide groove 74 and the slide pin 69 assist the translational motion of the slide shaft 76 in the Z-axis direction. An extraction stopper (unshown) is provided between the rotary member 66 and the slide shaft 76 so that the slide shaft 76 does not move in the X-axis direction with respect to the rotary member 66.

The slide pin 73 is inserted into the cam groove 52 formed on the base member 56. The slide pin 73 is in contact with an inner surface of the cam groove 52. Thus, the slide pin 73 has a function as a cam follower.

The surface of the connection member 77 on the +Z side is connected to the contact surface 41 formed on the projection lens 4 as mentioned above.

Next, the operation of the headlight device 102 will be described.

When the motorcycle 95 travels while turning leftward, the rotary member 66 receives driving force from the drive source 8 and rotates in the +RZ direction. The slide shaft 76 also rotates in the +RZ direction in the same way.

As the slide shaft 76 rotates in the +RZ direction, the slide pin 73 moves in the +Z-axis direction along the cam groove 52. Due to the movement of the slide pin 73 in the +Z-axis direction, the slide shaft 76 moves in the +Z-axis direction. Due to the movement of the slide shaft 76 in the +Z-axis direction, the tip end part 78 of the slide shaft 76 pushes out the contact surface 41 of the projection lens 4 in the +Z-axis direction via the link 75 and the connection member 77.

The projection lens 4 rotates around the rotation axis 42 to turn to the left (+X-axis direction side). In other words, the projection lens 4 rotates in the +RY direction around the rotation axis 42. The rotation axis 42 is formed by the rotary pins 40a and 40b.

As described above, the projection lens 4 can be rotated in the +RY direction around the rotation axis 42 without using the spring connecting the projection lens 4 and the rotary member 66.

Similarly, when the motorcycle 95 travels while turning rightward, the rotary member 66 receives driving force from the drive source 8 and rotates in the −RZ direction. The slide shaft 76 also rotates in the −RZ direction in the same way.

As the slide shaft 76 rotates in the −RZ direction, the slide pin 73 moves in the −Z-axis direction along the cam groove 52. Due to the movement of the slide pin 73 in the −Z-axis direction, the slide shaft 76 moves in the −Z-axis direction. Due to the movement of the slide shaft 76 in the −Z-axis direction, the tip end part 78 of the slide shaft 76 pulls back the contact surface 41 of the projection lens 4 in the −Z-axis direction via the link 75 and the connection member 77.

The projection lens 4 rotates around the rotation axis 42 to turn to the right (−X-axis direction side). In other words, the projection lens 4 rotates in the −RY direction around the rotation axis 42. The rotation axis 42 is formed by the rotary pins 40a and 40b.

As described above, the projection lens 4 can be rotated in the −RY direction around the rotation axis 42 without using the spring connecting the projection lens 4 and the rotary member 66.

The transmission mechanism 720 includes a transmission member 76 which transmits the rotation amount of the rotary member 66 around the first rotation axis 68 with respect to the base member 56 to the projection lens 4. The transmission mechanism 720 rotates the projection lens 4 around the second rotation axis 42 according to the rotation of the rotary member 66 with respect to the base member 56.

In the second modification, the transmission member 76 is described to include the slide shaft 76, for example. The transmission member 76 can include the link 75 or the connection member 77.

The transmission mechanism 720 includes a cam 52. In the second modification, the cam 52 is described as the cam groove 52, for example.

<Third Modification>

Figure 10:
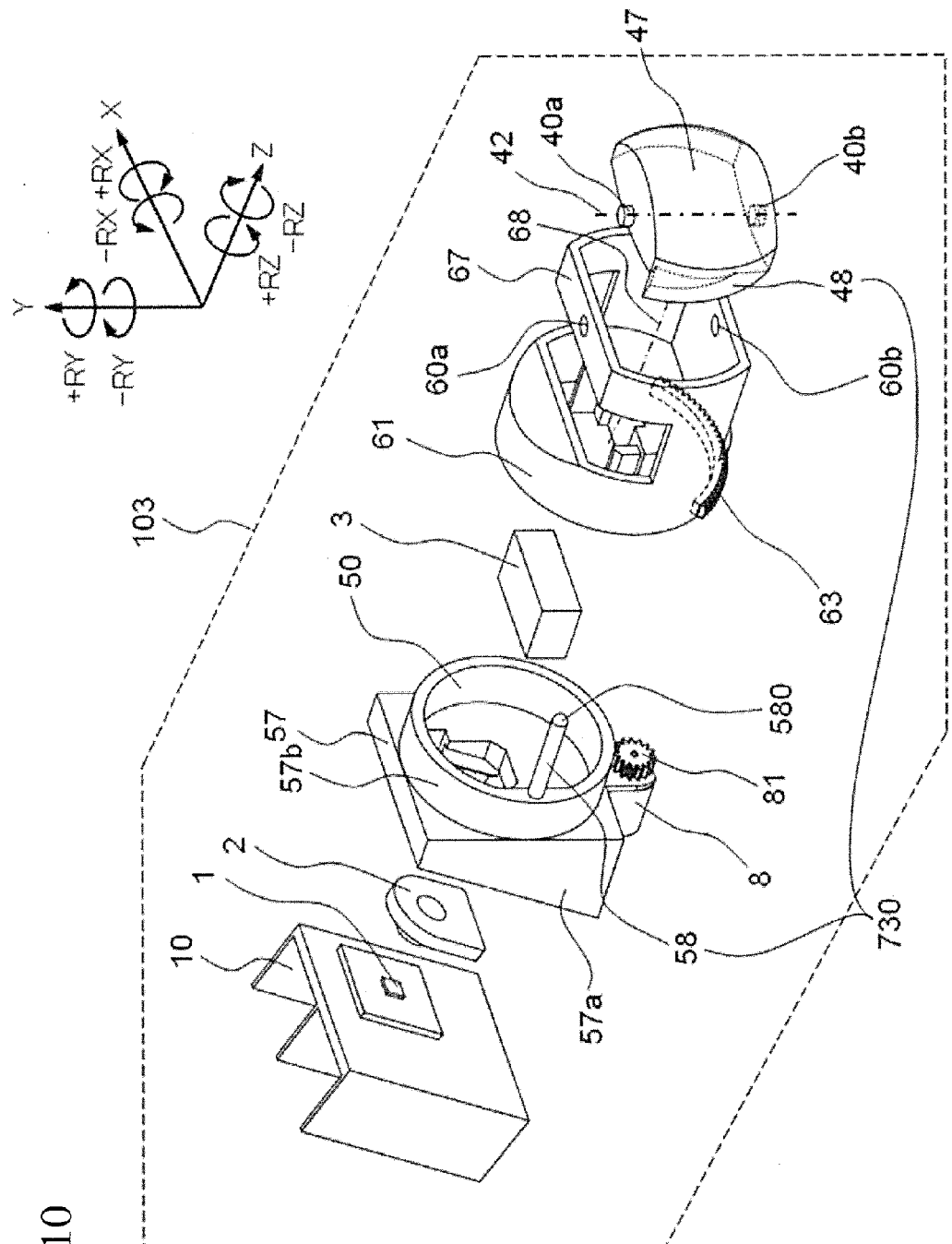
FIG. 10 is an exploded front perspective view of a headlight device 103 according to the first embodiment.
Figure 11:
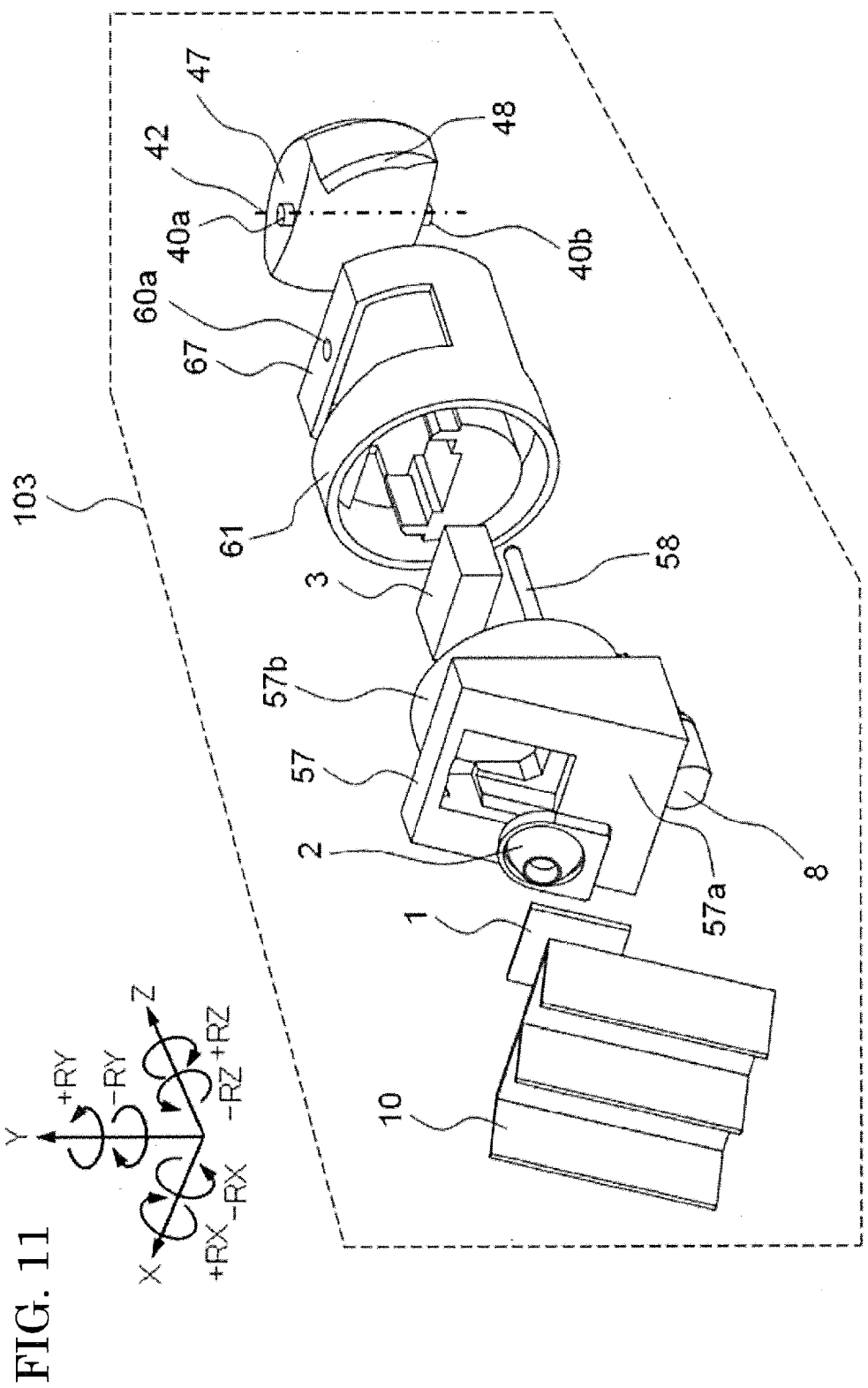
FIG. 11 is an exploded rear perspective view of the headlight device 103 according to the first embodiment.

FIG. 10 is an exploded front perspective view of a headlight device 103. The headlight device 103 is configured without using the inclined surface 51 of the base member 5, the inclined surfaces 51a and 51b of the base member 55, or the cam groove 52 of the base member 56. FIG. 11 is an exploded rear perspective view of the headlight device 103.

First, the configuration of the headlight device 103 will be described.

A base member 57 has a contact pin 58 instead of the inclined surface 51 formed on the base member 5. The rest of the configuration of the base member 57 is identical with that of the base member 5.

A rotary member 67 does not have the slide hole 62 formed through the rotary member 6. The rest of the configuration of the rotary member 67 is identical with that of the rotary member 6.

A projection lens 47 has an inclined surface 48. The projection lens 47 does not have the contact surface 41. The rest of the configuration of the projection lens 47 is identical with that of the projection lens 4.

The base member 57 has the contact pin 58. Thus, the base member 57 does not have the inclined surface 51. The contact pin 58 is an example of the transmission member. In FIG. 10, the contact pin 58 is indicated as a shaft. The contact pin 58 and the inclined surface 48 are an example of a transmission mechanism 730.

Similarly to the base member 5, the base member 57 has a plate-shaped part 57a and a cylinder-shaped part 57b.

The contact pin 58 is provided on a surface of the cylinder-shaped part 57b on the +Z-axis direction side. In FIG. 10, the surface of the cylinder-shaped part 57b on the +Z-axis direction side is a surface parallel to the X-Y plane. The contact pin 58 is formed at an end of the base member 57 on the −X-axis direction side. The contact pin 58 is formed in a central part of the base member 57 in the Y-axis direction side.

The contact pin 58 is a pin in parallel with the Z-axis. The contact pin 58 extends in the +Z-axis direction from the base member 57. In other words, the contact pin 58 extends in the +Z-axis direction from the surface of the cylinder-shaped part 57b on the +Z-axis direction side.

A tip end part of the contact pin 58 on the +Z-axis direction side has a hemispherical shape. The tip end part of the contact pin 58 on the +Z-axis direction side is a contactor 580.

The projection lens 47 differs from the projection lens 4 in having the inclined surface 48 instead of the contact surface 41. The rest of the configuration of the projection lens 47 is identical with that of the projection lens 4.

The inclined surface 48 is formed on a surface of the projection lens 47 on the −Z-axis side. The inclined surface 48 is a surface facing the −Z-axis side of the projection lens 47. The inclined surface 48 is formed on the −X-axis side of the projection lens 47.

The inclined surface 48 has a helical shape around the Z-axis. The inclined surface 48 is situated further in the +Z-axis direction as it goes in the +RZ direction. The inclined surface 48 is in a helical shape on which the position shifts in the +Z-axis direction along with the rotation in the +RZ direction.

The tip end part (contactor 580) of the contact pin 58 on the +Z-axis direction side is in contact with the inclined surface 48. The contact pin 58 is provided on the base member 57.

A spring (unshown) is connected between the projection lens 47 and the rotary member 67 so that the contact pin 58 and the inclined surface 48 remain in constant contact with each other. The spring is provided so that the projection lens 47 rotates in the −RY direction. The spring is, for example, a compression spring arranged on the +X-axis direction side or a tension spring arranged on the −X-axis direction side. The contactor 580 is in contact with the contact surface 41 due to the spring force applied to the projection lens 4.

Next, the operation of the headlight device 103 will be described.

When the motorcycle 95 travels while turning leftward, the rotary member 67 receives driving force from the drive source 8 and rotates in the +RZ direction. The projection lens 47 also rotates in the +RZ direction in the same way.

Since the inclined surface 48 is a surface having height difference in the Z-axis direction, when the projection lens 47 rotates around the rotation axis 68 parallel to the Z-axis, the position of contact between the contact pin 58 and the inclined surface 48 moves to a position on the inclined surface 48 at a different height difference. In other words, the position of contact between the contact pin 58 and the inclined surface 48 shifts in the Z-axis direction. The rotation axis 68 is the rotation axis of the rotary member 67.

When the projection lens 47 rotates in the +RZ direction, the position of contact between the contact pin 58 and the inclined surface 48 moves to a position on the inclined surface 48 at a greater height difference. Thus, a part of the projection lens 47 in the −X-axis direction is pushed out in the +Z-axis direction by the contact pin 58.

Then, the projection lens 47 rotates around the rotation axis 42 to turn to the left (+X-axis direction side). In other words, when the rotary member 67 rotates in the +RZ direction, the projection lens 47 rotates to turn to the left (+X-axis direction side). When the rotary member 67 rotates in the +RZ direction, the projection lens 47 rotates in the +RY direction.

When the motorcycle 95 travels while turning rightward, the rotary member 67 receives driving force from the drive source 8 and rotates in the −RZ direction. The projection lens 47 also rotates in the −RZ direction in the same way.

Since the inclined surface 48 is a surface having height difference in the Z-axis direction, when the projection lens 47 rotates around the rotation axis parallel to the Z-axis, the position of contact between the contact pin 58 and the inclined surface 48 moves to a position on the inclined surface 48 at a different height difference. In other words, the position of contact between the contact pin 58 and the inclined surface 48 shifts in the Z-axis direction. The rotation axis 68 is the rotation axis of the rotary member 67.

When the projection lens 47 rotates in the −RZ direction, the position of contact between the contact pin 58 and the inclined surface 48 moves to a position on the inclined surface 48 at a less height difference. Thus, the part of the projection lens 47 in the −X-axis direction moves in the −Z-axis direction due to the contact pin 58. The projection lens 47 receives the spring force in the −RY direction as mentioned above. Thus, the contactor 580 of the contact pin 58 and the inclined surface 48 are in constant contact with each other.

Due to the movement of the position of contact between the contact pin 58 and the inclined surface 48 to a position on the inclined surface 48 at a less height difference, the projection lens 47 rotates around the rotation axis 42 to turn to the right (−X-axis direction side). In other words, when the rotary member 67 rotates in the −RZ direction, the projection lens 47 rotates to turn to the right (−X-axis direction side). When the rotary member 67 rotates in the −RZ direction, the projection lens 47 rotates in the −RY direction.

Incidentally, the headlight device 103 described in the third modification implements the rotation of the projection lens 47 around the rotation axis 42 by forming the inclined surface 48 on the projection lens 47. As the method for rotating the projection lens 47, it is also possible to employ the cam follower structure described in the second modification, that is, the configuration in which the projection lens 47 is provided with the cam groove instead of the inclined surface 48.

The headlight device 103 includes the light source 1, the base member 57, a light distribution formation member 3, the rotary member 67, the projection lens 47 and the transmission mechanism 730.

In the first embodiment, the light distribution formation member 3 is described as the light guide member 3, for example.

In the third modification, the transmission mechanism 730 includes the contact pin 58 and the inclined surface 48, for example.

The light source 1 emits light. The base member 57 holds the light source 1. The light distribution formation member 3 receives incident light and forms the light distribution pattern 501 of the light.

The rotary member 67, holding the light distribution formation member 3, is held by the base member 57 to be rotatable around the first rotation axis 68.

The projection lens 47 receives incident light with which the light distribution pattern 501 has been formed and emits the light as the projection light. The projection lens 47 is held by the rotary member 67 to be rotatable around the second rotation axis 42 orthogonal to the first rotation axis 68.

The second rotation axis 42 extends in a direction corresponding to the up-and-down direction of the light distribution pattern 501 of the projection light.

The transmission mechanism 730 includes a transmission member 58 which transmits the rotation amount of the rotary member 67 around the first rotation axis 68 with respect to the base member 57 to the projection lens 47. The transmission mechanism 730 rotates the projection lens 47 around the second rotation axis 42 according to the rotation of the rotary member 67 with respect to the base member 57.

In the third modification, the transmission member 58 is described as the contact pin 58, for example.

The transmission member 58 is held by the base member 57, and a cam 48 is formed on the projection lens 47. In the third modification, the cam 48 is described as the inclined surface 48.

The transmission member 58 is a shaft.

<Fourth Modification>

Figure 12:
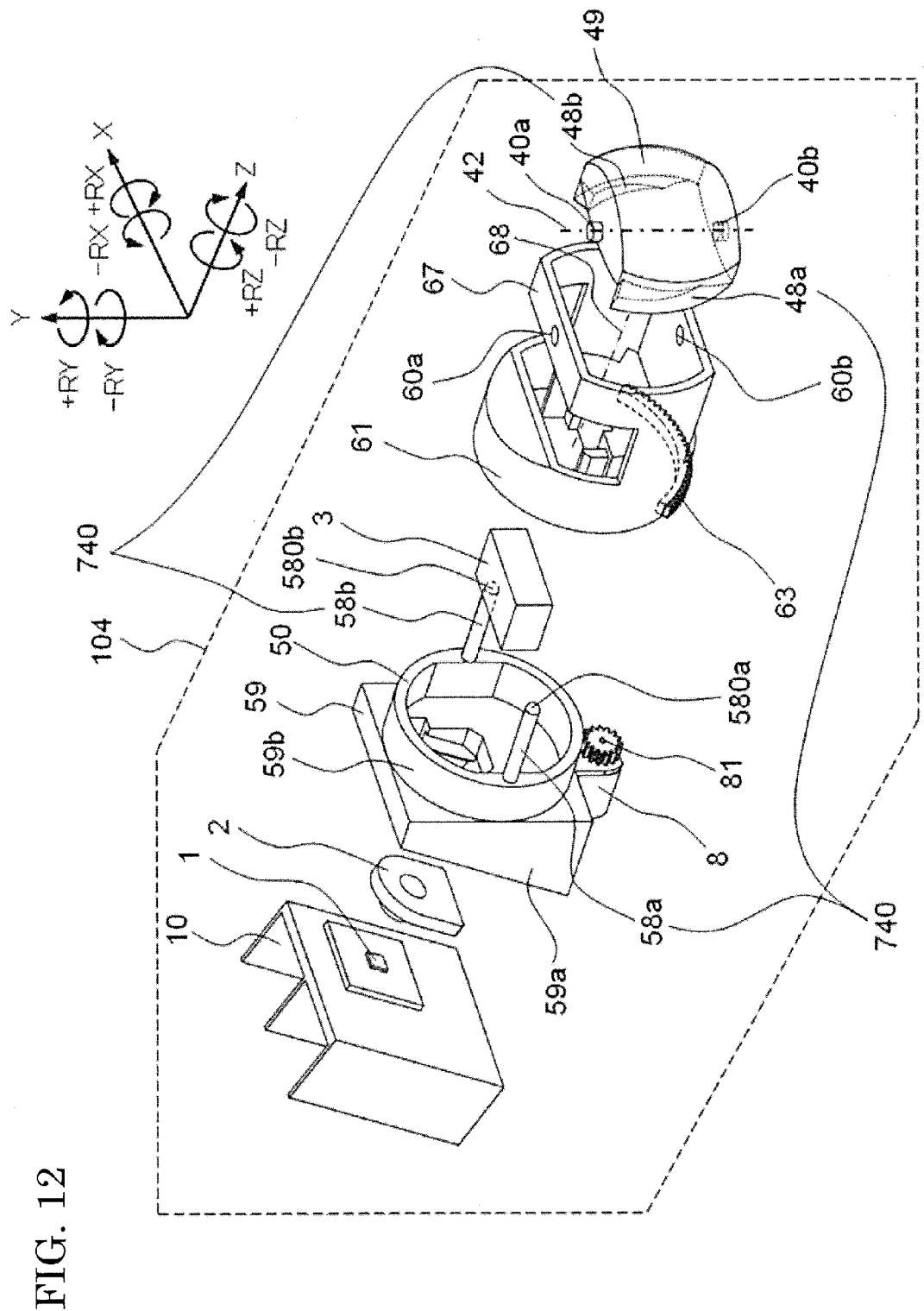
FIG. 12 is an exploded front perspective view of a headlight device 104 according to the first embodiment.

FIG. 12 is an exploded front perspective view of a headlight device 104. The headlight device 104 is configured without using the spring connected between the projection lens 47 and the rotary member 67.

First, the configuration of the headlight device 104 will be described.

A base member 59 has two contact pins 58a and 58b. It differs from the base member 57 described in the third modification in having the two contact pins 58a and 58b. The rest of the configuration of the base member 59 is identical with that of the base member 57 described in the third modification.

A projection lens 49 differs from the projection lens 47 described in the third modification in having two inclined surfaces 48a and 48b. The rest of the configuration of the projection lens 49 is identical with that of the projection lens 47.

The base member 59 has the two contact pins 58a and 58b. Thus, the base member 59 does not have the inclined surface 51. The contact pins 58a and 58b are an example of transmission members. In FIG. 12, the contact pins 58a and 58b are indicated as shafts. The contact pins 58a and 58b and the inclined surfaces 48a and 48b are an example of a transmission mechanism 740.

Similarly to the base member 5, the base member 59 has a plate-shaped part 59a and a cylinder-shaped part 59b.

The contact pins 58a and 58b are provided on a surface of the cylinder-shaped part 59b on the +Z-axis direction side. In FIG. 12, the surface of the cylinder-shaped part 59b on the +Z-axis direction side is a surface parallel to the X-Y plane.

The contact pin 58a is formed at an end of the base member 59 on the −X-axis direction side. The contact pin 58a is formed in a central part of the base member 59 in the Y-axis direction side.

The contact pin 58b is formed at an end of the base member 59 on the +X-axis direction side. The contact pin 58b is formed in a central part of the base member 59 in the Y-axis direction side.

The contact pins 58a and 58b are pins in parallel with the Z-axis. The contact pins 58a and 58b extend in the +Z-axis direction from the base member 59. In other words, the contact pins 58a and 58b extend in the +Z-axis direction from the surface of the cylinder-shaped part 59b on the +Z-axis direction side.

Tip end parts of the contact pins 58a and 58b on the +Z-axis direction side have hemispherical shapes. The tip end part of the contact pin 58a on the +Z-axis direction side is a contactor 580a. The tip end part of the contact pin 58b on the +Z-axis direction side is a contactor 580b.

The projection lens 49 differs from the projection lens 47 in having the inclined surface 48a and the inclined surface 48b. The rest of the configuration of the projection lens 49 is identical with that of the projection lens 47.

The inclined surface 48a is formed on a surface of the projection lens 49 on the −Z-axis side. The inclined surface 48a is a surface facing the −Z-axis side of the projection lens 49. The inclined surface 48a is formed on the −X-axis side of the projection lens 49.

The inclined surface 48a has a helical shape around the Z-axis. The inclined surface 48a is situated further in the +Z-axis direction as it goes in the +RZ direction. The inclined surface 48a is in a helical shape on which the position shifts in the +Z-axis direction along with the rotation in the +RZ direction.

The tip end part (contactor 580a) of the contact pin 58a provided on the base member 59 on the +Z-axis side is in contact with the inclined surface 48a.

The inclined surface 48b is formed on the surface of the projection lens 49 on the −Z-axis side. The inclined surface 48b is a surface facing the −Z-axis side of the projection lens 49. The inclined surface 48b is formed on the +X-axis side of the projection lens 49.

The inclined surface 48b has a helical shape around the Z-axis. The inclined surface 48b is situated further in the +Z-axis direction as it goes in the −RZ direction. The inclined surface 48b is in a helical shape on which the position shifts in the +Z-axis direction along with the rotation in the −RZ direction.

The tip end part (contactor 580b) of the contact pin 58b provided on the base member 59 on the +Z-axis side is in contact with the inclined surface 48b.

Next, the operation of the headlight device 104 will be described.

When the motorcycle 95 travels while turning leftward, the rotary member 67 receives driving force from the drive source 8 and rotates in the +RZ direction. The projection lens 49 also rotates in the +RZ direction in the same way.

Since the inclined surface 48a is a surface having height difference in the Z-axis direction, when the projection lens 49 rotates around the rotation axis 68 parallel to the Z-axis, the position of contact between the contact pin 58a and the inclined surface 48a moves to a position on the inclined surface 48a at a different height difference. In other words, the position of contact between the contact pin 58a and the inclined surface 48a shifts in the Z-axis direction. The rotation axis 68 is the rotation axis of the rotary member 67.

When the projection lens 49 rotates in the +RZ direction, the position of contact between the contact pin 58a and the inclined surface 48a moves to a position on the inclined surface 48a at a greater height difference. Thus, a part of the projection lens 49 in the −X-axis direction is pushed out in the +Z-axis direction by the contact pin 58a.

Then, the projection lens 49 rotates around the rotation axis 42 to turn to the left (+X-axis direction side). In other words, when the rotary member 67 rotates in the +RZ direction, the projection lens 49 rotates to turn to the left (+X-axis direction side). When the rotary member 67 rotates in the +RZ direction, the projection lens 49 rotates in the +RY direction.

In this case, according to the rotary movement of the projection lens 49 in the +RZ direction, the position of contact of the contact pin 58*b* on the inclined surface 48*b* shifts in the −Z-axis direction. Therefore, the contact pin 58*b* does not impede the rotary movement of the projection lens 49 in the +RZ direction.

When the motorcycle 95 travels while turning rightward, the rotary member 67 receives driving force from the drive source 8 and rotates in the −RZ direction. The projection lens 49 also rotates in the −RZ direction in the same way.

Since the inclined surface 48*b* is a surface having height difference in the Z-axis direction, when the projection lens 49 rotates around the rotation axis 68 parallel to the Z-axis, the position of contact between the contact pin 58*b* and the inclined surface 48*b* moves to a position on the inclined surface 48*a* at a different height difference. In other words, the position of contact between the contact pin 58*b* and the inclined surface 48*b* shifts in the Z-axis direction. The rotation axis 68 is the rotation axis of the rotary member 67.

When the projection lens 49 rotates in the −RZ direction, the position of contact between the contact pin 58*b* and the inclined surface 48*b* moves to a position on the inclined surface 48*a* at a greater height difference. Thus, a part of the projection lens 49 in the +X-axis direction is pushed out in the +Z-axis direction by the contact pin 58*b*.

Then, the projection lens 49 rotates around the rotation axis 42 to turn to the right (−X-axis direction side). In other words, when the rotary member 67 rotates in the −RZ direction, the projection lens 49 rotates to turn to the right (−X-axis direction side). When the rotary member 67 rotates in the −RZ direction, the projection lens 49 rotates in the −RY direction.

In this case, according to the rotary movement of the projection lens 49 in the −RZ direction, the position of contact of the contact pin 58*a* on the inclined surface 48*a* shifts in the −Z-axis direction. Therefore, the contact pin 58*a* does not impede the rotary movement of the projection lens 49 in the −RZ direction.

The transmission mechanism 740 includes transmission members 58*a* and 58*b* which transmit the rotation amount of the rotary member 67 around the first rotation axis 68 with respect to the base member 59 to the projection lens 49. The transmission mechanism 740 rotates the projection lens 49 around the second rotation axis 42 according to the rotation of the rotary member 67 with respect to the base member 59.

In the fourth modification, the transmission members 58*a* and 58*b* are described as the contact pins 58*a* and 58*b*, for example.

The transmission members 58*a* and 58*b* are held by the base member 59, and cams 48*a* and 48*b* are formed on the projection lens 49. In the fourth modification, the cams 48*a* and 48*b* are described as the inclined surfaces 48*a* and 48*b*.

Second Embodiment

Figure 13:
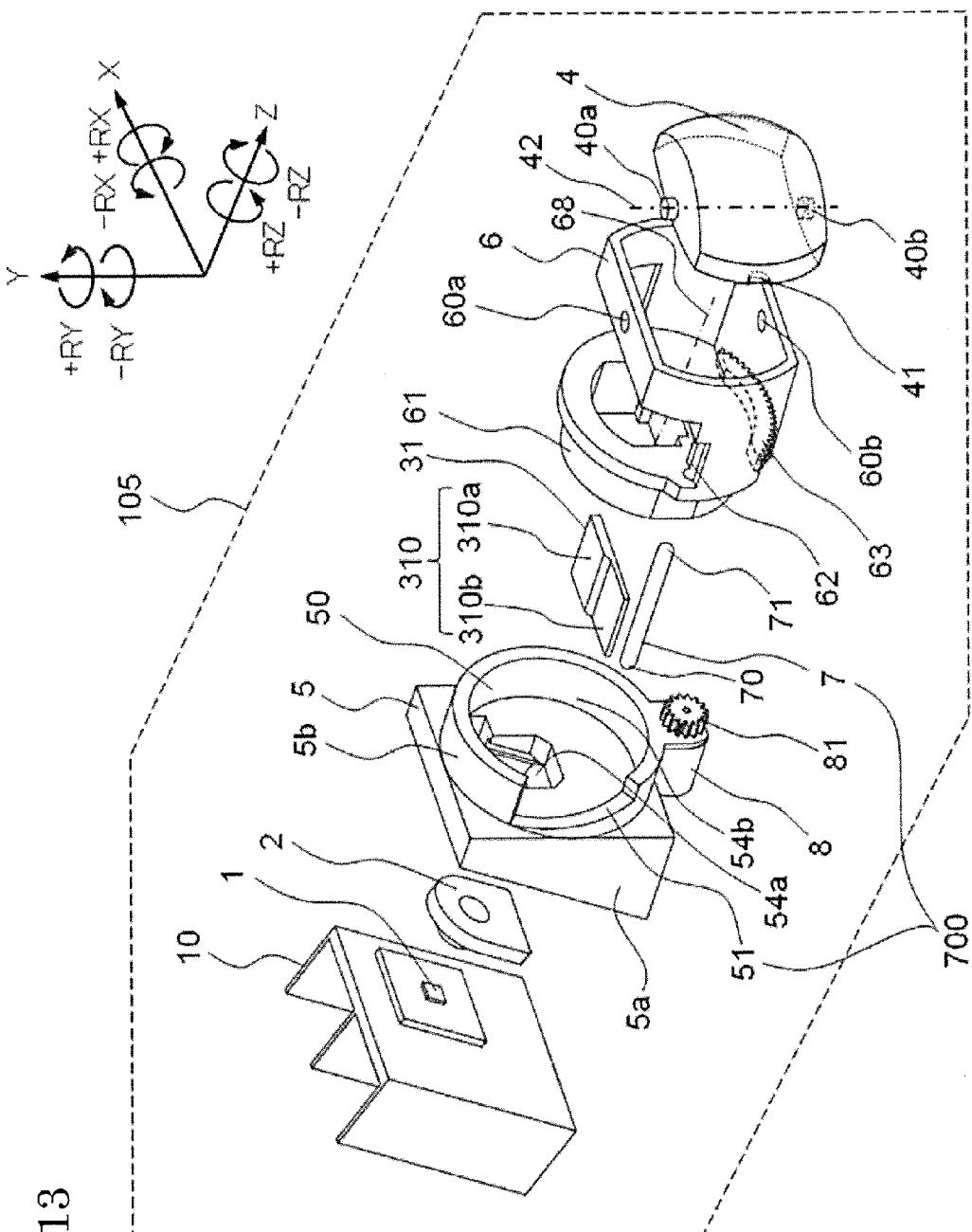
FIG. 13 is an exploded front perspective view of a headlight device 105 according to a second embodiment.

FIG. 13 is an exploded front perspective view of a headlight device 105. The configuration of the headlight device 105 differs from that of the headlight device 100 in that the headlight device 105 includes a reflective member 31 instead of the light guide member 3. Components equivalent to components of the headlight device 100 described in the first embodiment are assigned the same reference characters as in the first embodiment and explanation thereof is omitted.

The components equivalent to those of the headlight device 100 are the light source 1, the radiator 10, the condensing lens 2, the projection lens 4, the base member 5, the rotary member 6, the slide shaft 7, the drive source 8 and the pinion 81.

The reflective member 31 is in a shape like a flat plate extending in parallel with the Z-X plane, for example. The reflective member 31 has a reflective surface 310 which reflects light. The reflective member 31 has the reflective surface 310 on its surface in the +Y-axis direction.

The reflective member 31 is an example of the light distribution formation member. The light distribution formation member is an optical member for converting the light emitted from the light source 1 into the above-described light distribution pattern 501.

The light exiting from the condensing lens 2 travels in the +Z-axis direction.

The light exiting from the condensing lens 2 reaches the reflective member 31. The light reaching the reflective member 31 is reflected by the reflective surface 310 formed on the reflective member 31. The light reflected by the reflective surface 310 travels in the +Z-axis direction.

The light reflected by the reflective surface 310 enters the projection lens 4.

The reflective member 31 forms the light distribution pattern 501. In other words, the reflective member 31 transforms the incident light into the shape of the light distribution pattern 501. Put another way, the reflective member 31 is a light distribution formation member which forms the light distribution pattern of the light emitted from the light source 1.

In the reflective surface 310 of the reflective member 31 shown in FIG. 13, a surface 310*a* on the +X-axis direction side is situated in the +Y-axis direction in comparison with a surface 310*b* on the −X-axis direction side. With this configuration, the "rising line" of the light distribution pattern 501 is formed by the reflective surface 310 of the reflective member 31.

In cases where the vehicle travels on the left-hand side of the road, the cutoff line on the left-hand side with respect to the vehicle's traveling direction is high and the cutoff line on the right-hand side is low. This is for facilitating the recognition of pedestrians and recognition of traffic signs. The light distribution pattern 501 has a shape in which the illumination on the sidewalk's side (left-hand side) is raised by the "rising line". Incidentally, the cutoff line is the light boundary line at the upper side of the light distribution pattern 501.

The reflective member 31 is fixed to the rotary member 6. When the rotary member 6 rotates around the rotation axis 68, the reflective member 31 also rotates around the rotation axis 68 of the rotary member 6. In the second embodiment, the rotation axis 68 is an axis in parallel with the Z-axis.

While the reflective member 31 has been assumed to have a shape like a flat plate extending in parallel with the Z-X plane and to have the reflective surface 310 in the +Y-axis direction, the shape of the reflective member 31 is not limited to this.

The projection lens 4 is arranged on the +Z-axis direction side of the reflective member 31. The projection lens 4 magnifies and projects the incident light. The projection lens 4 is also provided on the rotary member 6.

Incidentally, the projection lens 4 is also usable for forming the light distribution pattern 501 by modifying the shape of the incidence surface or the exit surface.

As explained in the first embodiment, the projection lens 4 is capable of the rotation around the Z-axis and the rotation around the Y-axis with respect to the base member 5 according to the tilt of the vehicle body.

The reflective member 31 in the second embodiment can be employed for the configurations of the first through fourth modifications described in the first embodiment. Then, effects similar to those of the first through fourth modifications of the first embodiment can be achieved.

A light distribution formation member 31 is a reflective member. In the second embodiment, the light distribution formation member 31 is described as the reflective member 31, for example.

<Modification>

Figure 14:
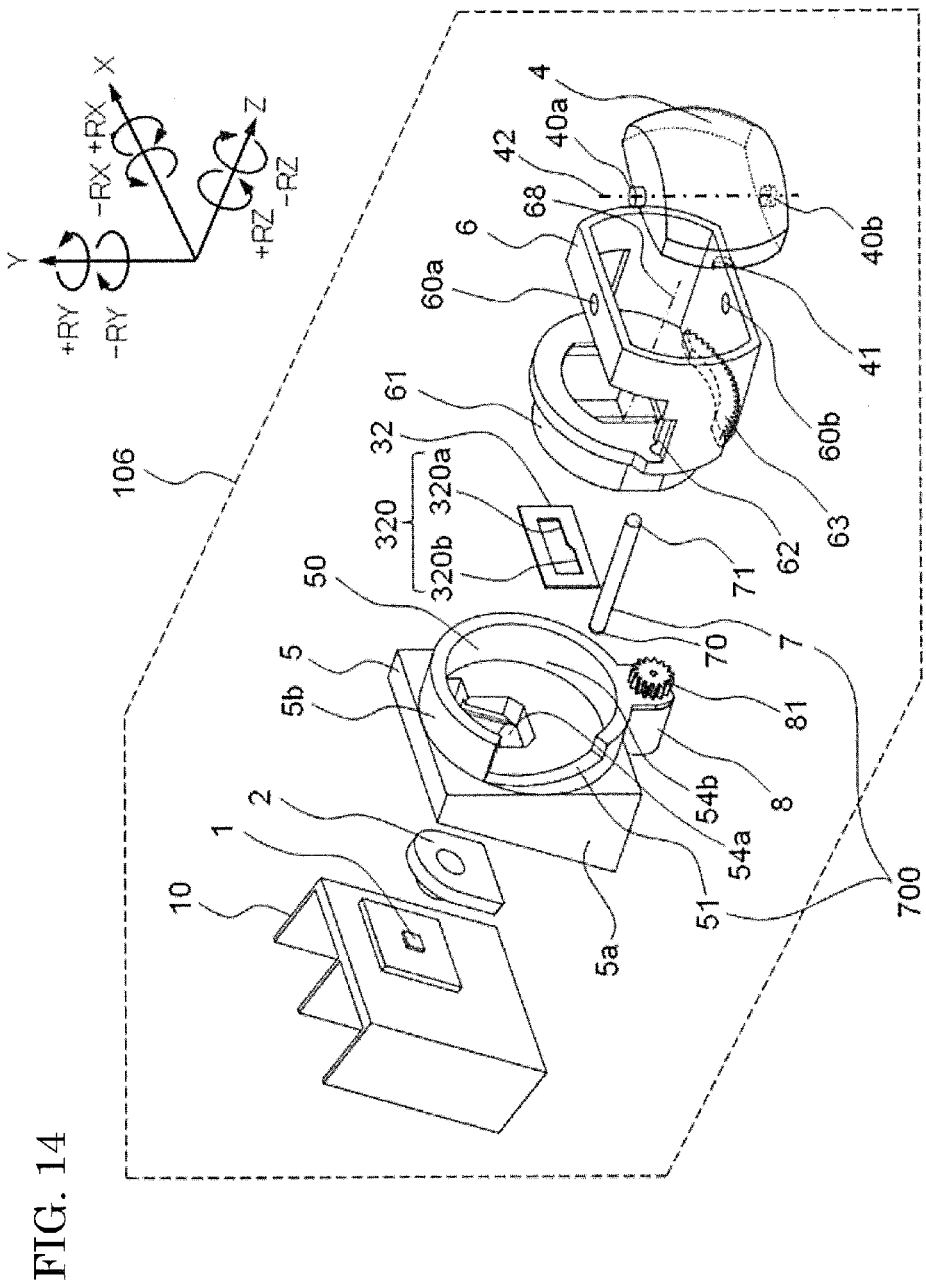
FIG. 14 is an exploded front perspective view of a headlight device 106 according to a modification of the second embodiment.

FIG. 14 is an exploded front perspective view of a headlight device 106. The headlight device 106 differs in the configuration in including a light blocking member 32 instead of the reflective member 31 of the headlight device 105. The other features of the headlight device 106 are equivalent to those of the headlight device 105.

The light blocking member 32 is in a shape like a flat plane extending in parallel with the X-Y plane, for example.

The light blocking member 32 has an opening part 320 which allows light to pass through. Part of the light exiting from the condensing lens 2 passes through the opening part 320 of the light blocking member 32. Light not passing through the opening part 320 is blocked by the light blocking member 32.

In FIG. 14, comparing sides of the opening part 320 of the light blocking member 32 situated on the −Y-axis direction side, the side 320a on the +X-axis direction side is situated in the +Y-axis direction in comparison with the side 320b on the −X-axis direction side. With this configuration, the "rising line" of the light distribution pattern 501 is formed by the opening part 320 of the light blocking member 32.

The light blocking member 32 forms the light distribution pattern 501 by blocking part of the incident light. In other words, the light blocking member 32 transforms the incident light into the shape of the light distribution pattern 501. The light blocking member 32 is a light distribution formation member which forms the light distribution pattern of the light emitted from the light source 1. Namely, the light blocking member 32 is an example of the light distribution formation member.

The light blocking member 32 is fixed to the rotary member 6. When the rotary member 6 rotates around the rotation axis 68, the light blocking member 32 also rotates around the rotation axis 68 of the rotary member 6.

While the light blocking member 32 has been assumed to have a shape like a flat plane extending in the X-Y plane, the shape of the light blocking member 32 is not limited to this.

A light distribution formation member 32 is a light blocking member. In the modification, the light distribution formation member 32 is described as the light blocking member 32, for example.

Incidentally, the light blocking member 32 in the modification of the second embodiment can be employed for the configurations of the first through fourth modifications described in the first embodiment. Then, effects similar to those of the first through fourth modifications of the first embodiment can be achieved.

The vehicle to be equipped with the headlight device according to each of the embodiments described above is not limited to motorcycles. For example, it can be employed for motor tricycles, such as motor tricycles called Gyros. The "motor tricycles called Gyros" mean scooters with three wheels including one front wheel and uniaxial two rear wheels. In Japan, they are categorized as motorized bicycles. They have a rotation axis in the vicinity of the center of the vehicle body and most of the vehicle body including the front wheel and the driver seat can be tilted in the left-and-right direction. With this mechanism, similarly to motorcycles, they are capable of shifting the barycenter inward at times of turning.

Further, the vehicle equipped with the headlight device according to each of the embodiments described above can also be employed as a four-wheeled automobile. In cases of four-wheeled automobiles, the vehicle body tilts rightward when it turns left at a corner, for example. When it turns right at a corner, the vehicle body tilts leftward. This is caused by the centrifugal force. In this regard, the bank direction is opposite to that of motorcycles. However, even in four-wheeled automobiles, it is possible to modify the light distribution pattern 501 by detecting the bank angle of the vehicle body. Further, by employing the headlight device according to the present invention, in cases where the vehicle body tilts, such as a case where only the wheels on one side runs on an obstacle or the like, the four-wheeled automobile is enabled to achieve the same light distribution pattern 501 as that in cases where the vehicle body is not tilted.

Furthermore, the vehicle equipped with the headlight device according to each embodiment described above can also be employed as a marine vessel or the like. There are marine vessels whose body tilts in the left-and-right direction when changing its course. The headlight device according to the present invention is effective also for such cases.

Incidentally, the above-described embodiments may include expressions using terms such as "parallel" and "orthogonal" indicating the positional relationship between components or the shape of a component. These expressions intend that a range in consideration of the tolerance in the manufacture, the variations in the assembling, and so forth should be included in the meaning of the term. Thus, when the claims include such expressions indicating the positional relationship between components or the shape of a component, it is intended that such a range in consideration of the tolerance in the manufacture, the variations in the assembling, and so forth is included.

While embodiments of the present invention have been described as above, the present invention is not to be restricted to these embodiments.

DESCRIPTION OF REFERENCE CHARACTERS

100: headlight device, 1: light source, 10: radiator, 2: condensing lens, 21: refractive part, 22: reflective part, 3: light guide member, 31: reflective member, 310: reflective surface, 310a, 310b: surface, 32: light blocking member, 320: opening part, 320a, 320b: side, 4, 45, 47, 49: projection lens, 40a, 40b: rotary pin, 41, 41a, 41b: contact surface, 42: rotation axis, 48, 48a, 48b: inclined surface, 5, 55, 56, 57, 59: base member, 5a, 55a, 56a, 57a, 59a: plate-shaped part, 5b, 55b, 56b, 57b, 59b: cylinder-shaped part, 50: receiving surface, 51, 51a, 51b: inclined surface, 52: cam groove, 54a: hole, 54b: hollow part, 580: contactor, 6, 65, 66, 67: rotary member, 60a, 60b: rotary hole, 61: rotary surface, 62, 62a, 62b: slide hole, 64: slide groove, 68: rotation axis, 69: slide pin, 7, 72a, 72b, 76: slide shaft, 73: slide pin, 74: slide groove, 70, 70a, 70b, 71, 71a, 71b: contactor, 75: link, 77: connection member, 78: tip end part, 8: drive source, 81: pinion, 95: motorcycle, 96: wheel, 96a: position of contact on ground surface, 500: road, 501: light distribution pattern, 502: center line, 503: corner region, 504: edge of road, d: tilt angle (bank angle)

What is claimed is:

1. A headlight device comprising:
a light source which emits light;
a base member which holds the light source;
a light distribution formation member which receives the light incident thereon and forms a light distribution pattern of the light;
a rotary member which holds the light distribution formation member and is held by the base member to be rotatable around a first rotation axis;
a projection lens which receives the light of which the light distribution pattern is formed, emits the light as projection light, and is held by the rotary member to be rotatable around a second rotation axis orthogonal to the first rotation axis; and
a transmission mechanism which includes a transmission member for transmitting a rotation amount of the rotary member around the first rotation axis with respect to the base member to the projection lens and rotates the projection lens around the second rotation axis according to rotation of the rotary member with respect to the base member,
wherein the second rotation axis extends in a direction corresponding to a up-and-down direction of the light distribution pattern of the projection light.

2. The headlight device according to claim 1, wherein:
the rotary member rotates around the first rotation axis so as to rotate the light distribution pattern of the projection light in a direction opposite to a direction in which the light distribution pattern of the projection light tilts according to a tilt of an attitude of the base member, and
the projection lens rotates in a horizontal direction of the light distribution pattern of the projection light to turn toward the direction in which the light distribution pattern of the projection light tilts.

3. The headlight device according to claim 1, wherein:
the transmission mechanism includes a cam, and
the projection lens rotates around the second rotation axis due to a change in a position of connection between the transmission member and the cam caused by the rotation of the rotary member around the first rotation axis.

4. The headlight device according to claim 3, wherein:
the transmission member is held by the rotary member, and
the transmission member moves in a direction of the first rotation axis due to the cam formed on the base member.

5. The headlight device according to claim 3, wherein:
the transmission member is held by the base member, and
the cam is formed on the projection lens.

6. The headlight device according to claim 1, wherein the transmission member is a shaft.

7. The headlight device according to claim 1, wherein the light distribution formation member is a light guide member.

8. The headlight device according to claim 1, wherein the light distribution formation member is a reflective member.

9. The headlight device according to claim 1, wherein the light distribution formation member is a light blocking member.

* * * * *